US011356171B2

(12) United States Patent
Xu et al.

(10) Patent No.: US 11,356,171 B2
(45) Date of Patent: Jun. 7, 2022

(54) MEDIUM ACCESS CONTROL-CONTROL ELEMENT DELAY FOR NON-TERRESTRIAL NETWORK

(71) Applicant: QUALCOMM Incorporated, San Diego, CA (US)

(72) Inventors: Huilin Xu, San Diego, CA (US); Xiao Feng Wang, San Diego, CA (US); Iyab Issam Sakhnini, San Diego, CA (US); Peter Gaal, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 16/562,289

(22) Filed: Sep. 5, 2019

(65) Prior Publication Data

US 2021/0075501 A1    Mar. 11, 2021

(51) Int. Cl.
*H04B 7/185*    (2006.01)
*H04W 76/14*    (2018.01)
*H04L 43/0852*    (2022.01)

(52) U.S. Cl.
CPC ..... *H04B 7/18513* (2013.01); *H04B 7/18523* (2013.01); *H04L 43/0852* (2013.01); *H04W 76/14* (2018.02)

(58) Field of Classification Search
CPC ........... H04B 7/18513; H04B 7/18523; H04W 76/14; H04L 43/0852
USPC .................................................. 370/329, 316
See application file for complete search history.

(56) References Cited

U.S. PATENT DOCUMENTS

| 2001/0043575 | A1  | 11/2001 | Kelly |
| 2016/0173188 | A1* | 6/2016  | Uchino .............. H04B 7/18513 370/316 |
| 2018/0083694 | A1  | 3/2018  | Rajagopalan et al. |
| 2019/0260456 | A1* | 8/2019  | Zhou .................... H04B 7/0695 |
| 2019/0342800 | A1* | 11/2019 | Sirotkin ............... H04B 17/318 |
| 2019/0364492 | A1* | 11/2019 | Azizi .................... H04W 48/16 |

(Continued)

FOREIGN PATENT DOCUMENTS

WO    WO-2020101908 A1    5/2020

OTHER PUBLICATIONS

International Search Report and Written Opinion—PCT/US2020/044111—ISA/EPO—dated Nov. 4, 2020.

(Continued)

*Primary Examiner* — Kwang B Yao
*Assistant Examiner* — Syed M Bokhari
(74) *Attorney, Agent, or Firm* — Holland & Hart LLP

(57) ABSTRACT

Methods, systems, and devices for wireless communications are described and may include a user terminal and a satellite establishing a communication link over a channel having a channel delay and a medium access control-control element (MAC-CE) delay being determined based on the channel delay. The user terminal and the satellite may be within a non-terrestrial network (NTN). The user terminal may receive a MAC-CE command that indicates a communication parameter to be implemented or adjusted. The user terminal may transmit feedback, for example, to the satellite in response to the MAC-CE command, and the user terminal and the satellite may communicate according to the communication parameter in the MAC-CE command after an end of the MAC-CE delay.

29 Claims, 19 Drawing Sheets

(56) References Cited

U.S. PATENT DOCUMENTS

2020/0313747 A1* 10/2020 Xu ................... H04W 72/046
2021/0029658 A1* 1/2021 Mahalingam ..... H04W 56/0005

OTHER PUBLICATIONS

Nokia, et al., "Overview for NR Supporting NTN", 3GPP TSG RAN WG1 Meeting #96, 3GPP Draft, R1-1901722, 3rd Generation Partnership Project (3GPP), Mobile Competence Centre, 650, Route Des Lucioles, F-06921, Sophia-Antipolis Cedex, France, vol. Ran WG1, No. Athens, Greece; Feb. 25, 2019-Mar. 1, 2019, Feb. 16, 2019 (Feb. 16, 2019), XP051599418, 10 Pages, Retrieved from the Internet: URL: http://www.3gpp.org/ftp/tsg%5Fran/WG1%5FRL1/TSGR1%5F96/Docs/R1%2D1901722%2Ezip [retrieved on Feb. 16, 2019], paragraph [02.5] the whole document.

* cited by examiner

MEDIUM ACCESS CONTROL-CONTROL ELEMENT DELAY FOR NON-TERRESTRIAL NETWORK

FIELD OF TECHNOLOGY

The following relates generally to wireless communications and more specifically to medium access control-control element (MAC-CE) delay for non-terrestrial networks (NTNs).

BACKGROUND

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as a user terminal or a user equipment (UE). Some wireless communications systems may support non-terrestrial networks, which may provide broad coverage areas by using high-altitude devices (for example, satellites or other non-terrestrial-based high-altitude equipment) in communication with terrestrial base stations (for example, next-generation NodeBs or giga-NodeBs (either of which may be referred to as a gNB)) or user terminals or both, or by including base stations on the high-altitude devices (for example, satellites). Although the use of high-altitude devices may provide some benefits, due to the long distance between one or more user terminals or one or more terrestrial base stations and one or more high-altitude devices, and due to the relatively high speeds of some high-altitude devices (for example, satellites) with given orbits, communications involving one or more of the user terminals, the terrestrial base stations, or the high-altitude devices may be challenging.

SUMMARY

The described techniques relate to methods, systems, devices, and apparatuses that support medium access control-control element (MAC-CE) delay for non-terrestrial networks (NTNs). Generally, the described techniques provide for updating a MAC-CE delay in a wireless communications system associated with a large propagation delay, for example, in an NTN in which a first device, such as the user terminal, and a second device, such as a high-altitude device, are far apart. A high-altitude device may also be referred to as a satellite herein. A MAC-CE delay may be a duration of time that must elapse before the first device (for example, the user terminal) and a second device (for example, a terrestrial base station, a high-altitude device, or both) begins implementing a new communication configuration associated with a MAC-CE command. The MAC-CE delay may be based on a channel delay between two devices in the NTN, such as between the user terminal and a high-altitude device, and in some examples the channel delay may be dynamic (for example, increase over time) as the distance between the two devices increases.

For example, NTNs may be associated with a large channel delay due to a large geographical separation between the devices in the network that results in a large propagation delay for the signaling between the devices in the network. In some examples when a large channel delay is present, a default MAC-CE delay may be insufficient for implementing the MAC-CE command at the proper time in the NTN network. Accordingly, an updated (for example, extended) MAC-CE delay may be used to ensure enough time is allocated based on the longer channel delay in the NTN network. Additionally, because the channel delay may change frequently, which may lead to a large variation in channel delay between a user terminal and a base station, the changing channel delay may also be accounted for with a MAC-CE delay.

According to some aspects, one or more devices in the network establish a communication link over a channel having a channel delay, may determine the channel delay of the communication link, and may determine a MAC-CE delay based on the channel delay. For example, determining the channel delay in an NTN may be based on one or more of a location of a high-altitude device in the NTN, a location of a beam of the high-altitude device, or a location of the user terminal. In some examples, the channel delay may be dynamically determined due to the large variations in the channel delay between a user terminal and a high-altitude device in the NTN. After determining the MAC-CE delay, the user terminal may receive a MAC-CE command that indicates a communication parameter to implement at some time in the future. The user terminal may transmit feedback to the high-altitude device in response to the MAC-CE command, and the user terminal and high-altitude device may communicate according to the communication parameter in the MAC-CE command after the expiration of the MAC-CE delay. Additionally or alternatively, in some examples, the user terminal may communicate with the high-altitude device indirectly, that is, through a terrestrial base station such that the user terminal may receive information from the high-altitude device through terrestrial base station, and vice versa.

The techniques and aspects described with reference to the figures, including FIGS. 1-19 apply to examples where the user terminal communicates directly with the high-altitude device, or communicates indirectly with the high-altitude device through a terrestrial base station, or communicates both directly with the high-altitude device and indirectly with the high-altitude device through a terrestrial base station—unless otherwise specifically noted.

In some examples, the MAC-CE delay may be based on the channel delay as well as other delays, such as inter-layer communication delays of one or more of the user terminal and the high-altitude device. In some implementations, a MAC-CE delay for an NTN may be defined independently from a type of a high-altitude device platform. In some implementations, different MAC-CE delays may be determined for different types of platforms or groups of types of platforms of high-altitude devices. Additionally or alternatively, a MAC-CE delay may be determined based on the orbit altitude of the platform (for example, an orbit altitude of a high-altitude device in the platform). In some examples, a MAC-CE delay may be determined for an individual user terminal or user equipment (UE) such that the MAC-CE delay may be user terminal specific. A user terminal may determine the MAC-CE delay in one or more ways. For example, multiple MAC-CE delays may be defined and stored at the user terminal. Additionally or alternatively, a second device, such as a high-altitude device, may transmit the MAC-CE delay or an indication thereof to the user terminal and the user terminal may make one or more operational adjustments based on the received MAC-CE delay or indication thereof.

A method of wireless communication at a user terminal in an NTN is described. The method may include establishing a communication link over a channel having a channel delay in the NTN, determining, based on the channel delay, a delay associated with a MAC-CEMAC-CE for communication in the NTN, receiving a MAC-CE command indicating a communication parameter, transmitting feedback based on the MAC-CE command, and communicating with the NTN over the channel according to the communication parameter after an end of the delay.

An apparatus for wireless communication at a user terminal in an NTN is described. The apparatus may include a processor, memory coupled with the processor, and instructions stored in the memory. The instructions may be executable by the processor to cause the apparatus to establish a communication link over a channel having a channel delay in the NTN, determine, based on the channel delay, a delay associated with a MAC-CE for communication in the NTN, receive a MAC-CE command indicating a communication parameter, transmit feedback based on the MAC-CE command, and communicate with the NTN over the channel according to the communication parameter after an end of the delay.

Another apparatus for wireless communication at a user terminal in an NTN is described. The apparatus may include means for establishing a communication link over a channel having a channel delay in the NTN, determining, based on the channel delay, a delay associated with a MAC-CE for communication in the NTN, receiving a MAC-CE command indicating a communication parameter, transmitting feedback based on the MAC-CE command, and communicating with the NTN over the channel according to the communication parameter after an end of the delay.

A non-transitory computer-readable medium storing code for wireless communication at a user terminal in an NTN is described. The code may include instructions executable by a processor to establish a communication link over a channel having a channel delay in the NTN, determine, based on the channel delay, a delay associated with a MAC-CE for communication in the NTN, receive a MAC-CE command indicating a communication parameter, transmit feedback based on the MAC-CE command, and communicate with the NTN over the channel according to the communication parameter after an end of the delay.

Some examples of the method, apparatuses, and non-transitory computer-readable medium described herein may further include operations, features, means, or instructions for determining an indication of the channel delay that may be based on one or more of a location of a satellite in the NTN, a location of a beam of the satellite, or a location of the user terminal, where determining the delay associated with the MAC-CE may be based on determining the indication of the channel delay.

Some examples of the method, apparatuses, and non-transitory computer-readable medium described herein may further include operations, features, means, or instructions for receiving an indication of the delay associated with the MAC-CE in a delay configuration, where determining the delay may be based on receiving the indication of the delay.

In some examples of the method, apparatuses, and non-transitory computer-readable medium described herein, receiving the indication of the delay in the delay configuration may include operations, features, means, or instructions for receiving the indication of the delay in one or more of a broadcast configuration message, a group configuration message, or a dedicated configuration message.

In some examples of the method, apparatuses, and non-transitory computer-readable medium described herein, receiving the indication of the delay in the delay configuration may include operations, features, means, or instructions for receiving the indication of the delay on one or more of a per satellite of the NTN basis, a per beam of the satellite basis, or a per cell of the NTN basis.

In some examples of the method, apparatuses, and non-transitory computer-readable medium described herein, determining the delay associated with the MAC-CE may include operations, features, means, or instructions for determining the delay before establishing the communication link.

In some examples of the method, apparatuses, and non-transitory computer-readable medium described herein, determining the delay may include operations, features, means, or instructions for determining the delay based on a configuration of a set of delays stored by the user terminal.

In some examples of the method, apparatuses, and non-transitory computer-readable medium described herein, determining the delay associated with the MAC-CE may include operations, features, means, or instructions for determining the delay independent of a type of a satellite in the NTN.

In some examples of the method, apparatuses, and non-transitory computer-readable medium described herein, the delay associated with the MAC-CE includes a time offset associated with transmitting the feedback, where communicating after the end of the delay includes communicating after an end of the time offset.

In some examples of the method, apparatuses, and non-transitory computer-readable medium described herein, the delay associated with the MAC-CE includes an indication of a slot number associated with the communication parameter of the MAC-CE command, where communicating after the end of the delay includes communicating in or after a slot corresponding to the slot number.

Some examples of the method, apparatuses, and non-transitory computer-readable medium described herein may further include operations, features, means, or instructions for determining a type of a satellite of the NTN, where determining the delay associated with the MAC-CE may be based on determining the type of the satellite of the NTN.

Some examples of the method, apparatuses, and non-transitory computer-readable medium described herein may further include operations, features, means, or instructions for determining an orbit of a satellite of the NTN, where determining the delay associated with the MAC-CE may be based on determining the orbit of the satellite.

In some examples of the method, apparatuses, and non-transitory computer-readable medium described herein, determining the orbit of the satellite may include operations, features, means, or instructions for determining a highest orbit altitude of the satellite or an average orbit altitude of the satellite.

In some examples of the method, apparatuses, and non-transitory computer-readable medium described herein, determining the delay associated with the MAC-CE may include operations, features, means, or instructions for determining that the delay may be greater than one or more of the channel delay, a slot duration, or an internal inter-layer delay.

Some examples of the method, apparatuses, and non-transitory computer-readable medium described herein may further include operations, features, means, or instructions for determining a timing advance based on the channel delay, where communicating with the NTN may be based on determining the timing advance.

In some examples of the method, apparatuses, and non-transitory computer-readable medium described herein, determining the delay associated with the MAC-CE may include operations, features, means, or instructions for determining that the delay may be greater than 3 milliseconds and based on an internal inter-layer delay including a communication delay between a physical layer and a medium access control layer.

Some examples of the method, apparatuses, and non-transitory computer-readable medium described herein may further include operations, features, means, or instructions for determining a second delay associated with a second MAC-CE for communication in the NTN, where the second delay may be different than the first delay, and communicating with the NTN over the channel according to the communication parameter after an end of the second delay.

In some examples of the method, apparatuses, and non-transitory computer-readable medium described herein, communicating with the NTN may include operations, features, means, or instructions for communicating directly between the user terminal and a satellite in the NTN.

A method of wireless communication at a satellite in an NTN is described. The method may include establishing a communication link over a channel having a channel delay in the NTN, transmitting a MAC-CE command indicating a communication parameter, receiving feedback associated with a user terminal based on transmitting the MAC-CE command, and communicating with the NTN over the channel according to the communication parameter after an end of a delay associated with a MAC-CE.

An apparatus for wireless communication at a satellite in an NTN is described. The apparatus may include a processor, memory coupled with the processor, and instructions stored in the memory. The instructions may be executable by the processor to cause the apparatus to establish a communication link over a channel having a channel delay in the NTN, transmit a MAC-CE command indicating a communication parameter, receive feedback associated with a user terminal based on transmitting the MAC-CE command, and communicate with the NTN over the channel according to the communication parameter after an end of a delay associated with a MAC-CE.

Another apparatus for wireless communication at a satellite in an NTN is described. The apparatus may include means for establishing a communication link over a channel having a channel delay in the NTN, transmitting a MAC-CE command indicating a communication parameter, receiving feedback associated with a user terminal based on transmitting the MAC-CE command, and communicating with the NTN over the channel according to the communication parameter after an end of a delay associated with a MAC-CE.

A non-transitory computer-readable medium storing code for wireless communication at a satellite in an NTN is described. The code may include instructions executable by a processor to establish a communication link over a channel having a channel delay in the NTN, transmit a MAC-CE command indicating a communication parameter, receive feedback associated with a user terminal based on transmitting the MAC-CE command, and communicate with the NTN over the channel according to the communication parameter after an end of a delay associated with a MAC-CE.

Some examples of the method, apparatuses, and non-transitory computer-readable medium described herein may further include operations, features, means, or instructions for determining the delay associated with the MAC-CE, and transmitting an indication of the delay associated with the MAC-CE, where communicating with the NTN over the channel according to the communication parameter after the end of the delay may be based on transmitting the indication of the delay.

In some examples of the method, apparatuses, and non-transitory computer-readable medium described herein, transmitting the indication of the delay may include operations, features, means, or instructions for transmitting the indication of the delay in one or more of a broadcast configuration message, a group configuration message, or a dedicated configuration message.

Some examples of the method, apparatuses, and non-transitory computer-readable medium described herein may further include operations, features, means, or instructions for determining, based on the channel delay, the delay associated with the MAC-CE for communication specific to the user terminal in the NTN.

Some examples of the method, apparatuses, and non-transitory computer-readable medium described herein may further include operations, features, means, or instructions for transmitting an indication of the channel delay that may be based on one or more of a location of a satellite in the NTN, a location of a beam of the satellite, or a location of the user terminal, where communicating with the NTN over the channel according to the communication parameter after the end of the delay may be based on transmitting the indication of the channel delay.

In some examples of the method, apparatuses, and non-transitory computer-readable medium described herein, the delay associated with the MAC-CE includes a time offset associated with receiving the feedback, where communicating after the end of the delay includes communicating after an end of the time offset.

In some examples of the method, apparatuses, and non-transitory computer-readable medium described herein, the delay associated with the MAC-CE includes an indication of a slot number associated with the communication parameter of the MAC-CE command, where communicating after the end of the delay includes communicating in or after a slot corresponding to the slot number.

In some examples of the method, apparatuses, and non-transitory computer-readable medium described herein, communicating with the NTN may include operations, features, means, or instructions for communicating directly between the satellite and the user terminal in the NTN.

DETAILED DESCRIPTION

Figure 1:
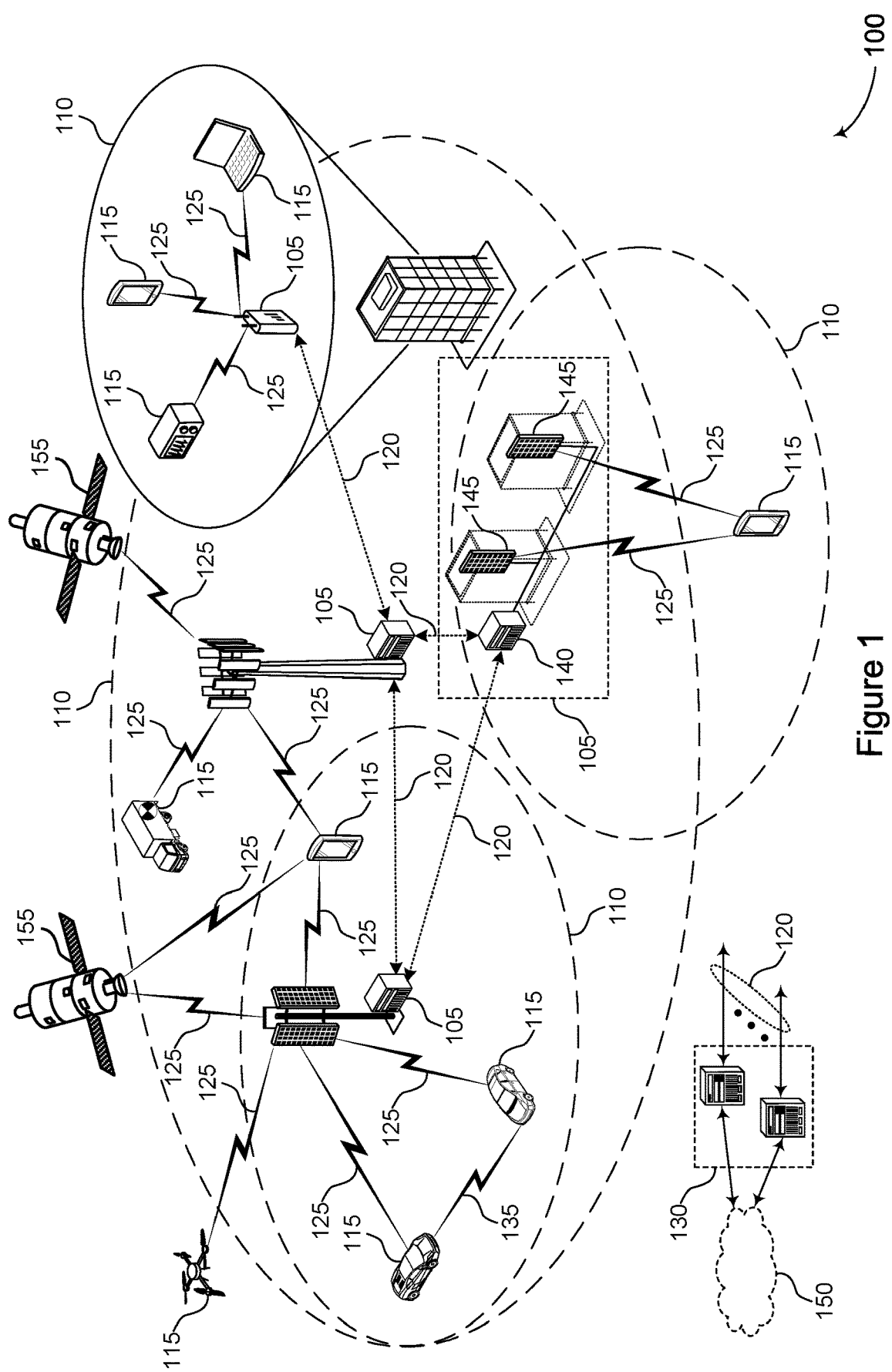
FIG. 1 illustrates an example of a wireless communications system that supports medium access control-control element delay for non-terrestrial networks in accordance with aspects of the present disclosure.

Non-terrestrial networks (NTNs) may provide coverage to a geographic area by using one or more high-altitude devices (for example, satellites) in communication with one or more user terminals or one or more base stations (for example, next-generation NodeBs or giga-NodeBs (either of which may be referred to as a gNB)) (also referred to as access stations or access gateways)), or both one or more user terminals and one or more base stations. A high-altitude device may also be referred to as a satellite herein and a terrestrial base station may also be referred to as a base station herein.

In some examples, base stations may, for example, transmit data to a satellite which may then be transmitted to a user terminal or the base stations may transmit data to a user terminal which may then be transmitted to a satellite. Alternatively, a user terminal may communicate with a satellite indirectly through a terrestrial base station. In some examples, a satellite itself may be or include functionality of a base station. In such examples, the satellite and the user terminal may communicate directly. Examples of a user terminal may include a user equipment (UE), or a relay equipment configured to relay a signal between a satellite and a user terminal, or other devices.

In NTNs, the terrestrial devices (for example, a base station or a user terminal) and a satellite may be thousands of kilometers apart, and it may take time for electromagnetic waves to propagate over the distance between the terrestrial devices and the satellite. The propagation delays for NTNs may be many orders of magnitude larger than the propagation delays for terrestrial networks. As such, the round trip delay (RTD) associated with a signal may also be orders of magnitude larger for NTNs than for terrestrial networks. Due to the high mobility of satellites, such as non-geostationary satellites, communications with the satellites may promote large and time-varying RTDs and Doppler offsets. These variations in RTDs and Doppler offsets may be associated with the channel delay between a user terminal and a satellite. This channel delay may cause user terminals to experience variations in uplink timing and frequency synchronization with one or more satellites. As demand for communication efficiency increases, it may be desirable for wireless communications systems to support functionality for estimating the channel delay and correcting time and frequency errors, particularly due to variations in the timing for implementing new communication parameters, such as the parameters indicated in medium access control-control element (MAC-CE) commands associated with the NTN.

As described herein, a MAC-CE delay may refer to a duration of time that must elapse before the user terminal and one or more other devices (for example, a satellite or a base station) begins implementing a new communication configuration associated with a MAC-CE command. The described techniques relate to updating a MAC-CE delay in a wireless communications system in which there is a large propagation delay, for example, in an NTN. The MAC-CE delay may be based on the channel delay between the user terminal and base station, and the channel delay may increase as the distance between a user terminal and a satellite increases. As described above, NTNs may have a large channel delay due to a large geographical separation between the user terminal and the satellite. In some examples when a large channel delay is present, some defined MAC-CE delays for terrestrial networks may be insufficient for implementing the MAC-CE command at the proper time in an NTN. For example, a user terminal may not implement the MAC-CE command before the satellite transitions to following a communication parameter indicated by the MAC-CE command and vice-versa. Accordingly, an alternative MAC-CE delay may be used in the NTN to ensure enough time for the MAC-CE command to take effect (for example, be implemented by one or more devices in the NTN) when large channel delay is present. Additionally, because there may be a large variation in the channel delay between a user terminal and a satellite in an NTN, the MAC-CE delay may be dynamically determined (for example, at different times) to account for the variations in the channel delay.

According to some aspects, a user terminal establishes a communication link over a channel having a channel delay, determines the channel delay, and determines a MAC-CE delay based on the determined channel delay. For example, determining the channel delay in an NTN may be based on one or more of a location of a satellite in the NTN, a location of a beam of the satellite, or a location of the user terminal. The user terminal may receive a MAC-CE command that indicates a communication parameter to implement (for example, at some time in the future). The user terminal may transmit feedback, for example, an acknowledgement (ACK), to the satellite in response to the MAC-CE command. The user terminal and the satellite may then communicate according to the communication parameter indicated by the MAC-CE command after the expiration of the MAC-CE delay.

In some aspects, the MAC-CE delay may be determined based on the channel delay as well as other delays, such as inter-layer communication delays at one or more of the user terminal and the satellite. In some implementations, a MAC-CE delay for an NTN may be defined independently from a type of a satellite platform. In some implementations, different MAC-CE delays may be determined for different types of platforms or groups of types of platforms of satellites. Additionally or alternatively, a MAC-CE delay may be determined based on the orbit altitude of the platform (for example, an orbit altitude of a satellite in the platform). In some examples, a MAC-CE delay may be determined for an individual user terminal or user equipment (UE) such that the MAC-CE delay may be user terminal specific. A user terminal may determine the MAC-CE delay in one or more ways. For example, multiple MAC-CE delays may be defined and stored at the user terminal. In some other examples, a second device, such as a satellite, may transmit the MAC-CE delay or an indication thereof to the user terminal and the user terminal may make one or more operational adjustments based on the received MAC-CE delay or indication thereof.

The techniques and aspects described with reference to the figures, including FIGS. 1-19 apply to examples where the user terminal communicates directly with the high-altitude device, or communicates indirectly with the high-altitude device through a terrestrial base station, or communicates both directly with the high-altitude device and indirectly with the high-altitude device through a terrestrial base station—unless otherwise specifically noted.

Aspects of the disclosure are initially described in the context of wireless communications systems. Aspects of the disclosure are further described in the context of one or more additional wireless communications systems, a timeline, and multiple process flows that relate to aspects for MAC-CE delay for an NTN. Aspects of the disclosure are further illustrated by and described with reference to apparatus diagrams, system diagrams, and flowcharts that relate to MAC-CE delay for an NTN.

FIG. 1 illustrates an example of a wireless communications system 100 that supports MAC-CE delay for an NTN in accordance with aspects of the present disclosure. The wireless communications system 100 may include base stations 105, user terminals 115, a core network 130, and satellites 155. In some examples, the wireless communications system 100 may be a New Radio (NR) network, among other communication system examples. In some examples, the wireless communications system 100 may support enhanced broadband communications, ultra-reliable (for example, mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and user terminals 115 may wirelessly communicate via one or more communication links 125. Each base station 105 may provide a coverage area 110 over which user terminals 115 and the base station 105 may establish communication links 125. The coverage area 110 may be an example of a geographic area over which a base station 105 and a user terminal 115 support the communication of signals according to one or more radio access technologies.

User terminals 115 may be dispersed throughout a coverage area 110 of the wireless communications system 100, and each user terminal 115 may be stationary, or mobile, or both at different times. User terminals 115 may be devices in different forms or having different capabilities. Some example user terminals 115 are illustrated in FIG. 1. The user terminals 115 described herein may be able to communicate with various types of devices, such as other user terminals 115, base stations 105, or network equipment (for example, core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (for example, via an S1, N2, N3, or other interface). Base stations 105 may communicate with one another over backhaul links 120 (for example, via an X2, Xn, or other interface) either directly (for example, directly between base stations 105), or indirectly (for example, via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A user terminal 115 may include or may be referred to as a mobile device, a wireless device, a remote device, a handheld device, or a subscriber device, or some other suitable terminology, in which the "device" may also be referred to as a unit, a station, a terminal, or a client, among other examples. A user terminal 115 may also include or may be referred to as a personal electronic device such as a cellular phone, a personal digital assistant (PDA), a tablet computer, a laptop computer, or a personal computer. In some examples, a user terminal 115 may include or be referred to as a wireless local loop (WLL) station, an Internet of Things (IoT) device, an Internet of Everything (IoE) device, a machine type communications (MTC) device, among other examples, which may be implemented in various objects such as appliances, vehicles, meters, or among other examples.

The user terminals 115 described herein may be able to communicate with various types of devices, such as other user terminals 115 that may sometimes act as relays as well as base stations 105 and network equipment including macro eNBs or gNBs, small cell eNBs or gNBs, relay base stations, among other examples, as shown in FIG. 1.

User terminals 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (for example, a bandwidth part (BWP)) that is operated according to physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a user terminal 115 using carrier aggregation or multi-carrier operation. A user terminal 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the user terminals 115. A carrier may be operated in a standalone mode in which initial acquisition and connection may be conducted by the user terminals 115 via the carrier, or the carrier may be operated in a non-standalone mode in which a connection is anchored using a different carrier (for example, of the same or a different radio access technology).

Communication links 125 shown in the wireless communications system 100 may include uplink transmissions from a user terminal 115 to a base station 105, or downlink transmissions from a base station 105 to a user terminal 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the user terminals 115, or both) may have hardware configurations that support communications over a particular carrier bandwidth or may be configurable to support communications over one of a set of carrier bandwidths. In some examples, the wireless communications system 100 may include base stations 105 or user terminals 115 that support simultaneous communications via carriers associated with multiple carrier bandwidths. In some examples, each served user terminal 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a user terminal 115 receives and the higher the order of the modulation scheme, the higher the data rate may be for the user terminal 115. A wireless communications resource may refer to a combination of a radio frequency spectrum resource, a time resource, and a spatial resource (for example, spatial layers or beams), and the use of multiple spatial layers may further increase the data rate or data integrity for communications with a user terminal 115.

One or more numerologies for a carrier may be supported, in which a numerology may include a subcarrier spacing ($\Delta f$) and a cyclic prefix. A carrier may be divided into BWPs having the same or different numerologies. In some examples, a user terminal 115 may be configured with multiple BWPs. In some implementations, a single BWP for a carrier is active at a given time, and communications for the user terminal 115 may be restricted to active BWPs.

Time intervals for base stations 105 or user terminals 115 may be expressed in multiples of a basic time unit which may, for example, refer to a sampling period of $T_s=1/(\Delta f_{max} \cdot N_f)$ seconds, in which $\Delta f_{max}$ may represent the largest supported subcarrier spacing, and $N_f$ may represent the largest supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of user terminals 115. For example, user terminals 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple user terminals 115 and UE-specific or user terminal-specific search space sets for sending control information to a specific user terminal 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, exterior spaces between or overlapping with geographic coverage areas 110, among other examples.

A macro cell generally covers a relatively large geographic area (for example, several kilometers in radius) and may allow unrestricted access by user terminals 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to user terminals 115 with service subscriptions with the network provider or may provide restricted access to user terminals 115 having an association with the small cell (for example, user terminals 115 in a closed subscriber group (CSG), user terminals 115 associated with users in a home or office, among other examples). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some user terminals 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for user terminals 115 include entering a power saving deep sleep mode when not engaging in active communications, operating over a limited bandwidth (for example, according to narrowband communications), or a combination of these techniques. For example, some user terminals 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. User terminals 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a user terminal 115 may also be able to communicate directly with other user terminals 115 over a device-to-device (D2D) communication link 135 (for example, using a peer-to-peer (P2P) or D2D protocol). One or more user terminals 115 utilizing D2D communications may be within the geographic coverage area 110 of a base station 105. Other user terminals 115 in such a group may be outside the geographic coverage area 110 of a base station 105 or be otherwise unable to receive transmissions from a base station 105. In some examples, groups of user terminals 115 communicating via D2D communications may utilize a one-to-many (1:M) system in which each user terminal 115 transmits to every other user terminal 115 in the group. In some examples, a base station 105 facilitates the scheduling of resources for D2D communications. In other cases, D2D communications are carried out between user terminals 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), a user plane function (UPF)). The control plane entity may manage non-access stratum (NAS) functions such as mobility, authentication, and bearer management for user terminals 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with user terminals 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, but the waves may penetrate structures sufficiently for a macro cell to provide service to user terminals 115 located indoors. Transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between user terminals 115 and base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and user terminals 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, D2D transmissions, among other examples.

A base station 105 or a user terminal 115 may be equipped with multiple antennas, which may be used to employ techniques such as transmit diversity, receive diversity, multiple-input multiple-output (MIMO) communications, or beamforming. The antennas of a base station 105 or user terminal 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a user terminal 115. Likewise, a user terminal 115 may have one or more antenna arrays that may support various MIMO or beamforming operations. Additionally or alternatively, an antenna panel may support radio frequency beamforming for a signal transmitted via an antenna port.

Base stations 105 or user terminals 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a user terminal 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a user terminal 115 may use beam sweeping techniques as part of beam forming operations. For example, a base station 105 may use multiple antennas or antenna arrays (for example, antenna panels) to conduct beamforming operations for directional communications with a user terminal 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or a receiving device, such as a user terminal 115) a beam direction for subsequent transmission or reception by the base station 105.

Some signals, such as data signals associated with a particular receiving device, may be transmitted by a base station 105 in a single beam direction (for example, a direction associated with the receiving device, such as a user terminal 115). In some examples, the beam direction associated with transmissions along a single beam direction may be determined based on a signal that was transmitted in different beam directions. For example, a user terminal 115 may receive one or more of the signals transmitted by the base station 105 in different directions and may report to the base station 105 an indication of the signal that the user terminal 115 received with a highest signal quality, or an otherwise acceptable signal quality.

In some examples, transmissions by a device (for example, by a base station 105 or a user terminal 115) may be performed using multiple beam directions, and the device may use a combination of digital precoding or radio frequency beamforming to generate a combined beam for transmission (for example, from a base station 105 to a user terminal 115). The user terminal 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The user terminal 115 may provide feedback for beam selection, which may be a precoding matrix indicator (PMI) or codebook-based feedback (for example, a multi-panel type codebook, a linear combination type codebook, a port selection type codebook). Although such techniques are described with reference to signals transmitted in one or more directions by a base station 105, a user terminal 115 may employ similar techniques for transmitting signals multiple times in different directions (for example, for identifying a beam direction for subsequent transmission or reception by the user terminal 115) or for transmitting a signal in a single direction (for example, for transmitting data to a receiving device).

A receiving device (for example, a user terminal 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a user terminal 115 and a base station 105 or a core network 130 supporting radio bearers for user plane data. At the Physical layer, transport channels may be mapped to physical channels.

The user terminals 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

As described above, the wireless communications system 100 also includes at least one satellite 155. The satellite 155 may communicate with one or more of the base stations 105 and the user terminals 115 (such as UEs). The satellite 155 may be any suitable type of communication satellite configured to facilitate communications between different nodes in a wireless communication system, such as an NTN. The satellite 155 may be an example of a space satellite, a balloon, a dirigible, an airplane, a drone, or an unmanned aerial vehicle, among other examples. In some examples, the satellite 155 may be or include a geosynchronous or geostationary earth orbit (GEO) satellite, a low earth orbit (LEO) satellite or a medium earth orbit (MEO) satellite, or a high-altitude platform (HAP), among other examples. In some examples, the satellite 155 may be a multi-beam satellite configured to provide service for multiple service beam coverage areas in a defined geographical service area.

In some examples, a cell may be provided or established by a satellite 155 as part of an NTN. A satellite 155 may, in some examples, perform the functions of a base station 105. For example, the satellite 155 may directly communicate with the core network 130 without utilizing a terrestrial base station (for example, the base station 105), may directly communicate with one or more devices, such as one or more user terminals 115, or both. In some other examples, the satellite 155 may be an example of a relay transponder for a base station 105.

The wireless communications system 100 may be a network with a large channel delay, for example, an NTN. The implementations, techniques, and aspects described herein may be explained in the context of an NTN, but are applicable to any network—whether an NTN or not—with increased channel delay.

In the wireless communications system 100, a user terminal 115 may establish a communication link over a channel having a channel delay. In the example of an NTN, the channel delay may be greater than a channel delay experienced in terrestrial networks. The user terminal 115 may determine the channel delay and may determine a MAC-CE delay based on the channel delay. For example, determining the channel delay in an NTN may be based on one or more of a location of a satellite 155 in the NTN, a location of a beam of the satellite 155, or a location of the user terminal 115. The user terminal 115 may receive a MAC-CE command, for example, from the satellite 155, that may indicate a communication parameter to be implemented or to take effect in the future. The communication parameter may include a revised channel state information (CSI) report timeline or a new reference signal (RS) resource configuration, among other examples. The user terminal 115 may transmit feedback, for example, a HARQ ACK, to the satellite 155 to indicate the successful reception of the MAC-CE command, and the user terminal 115 and the satellite 155 may communicate according to the communication parameter indicated by the MAC-CE command after the end of the MAC-CE delay (for example, after the MAC-CE delay has elapsed).

Figure 2:
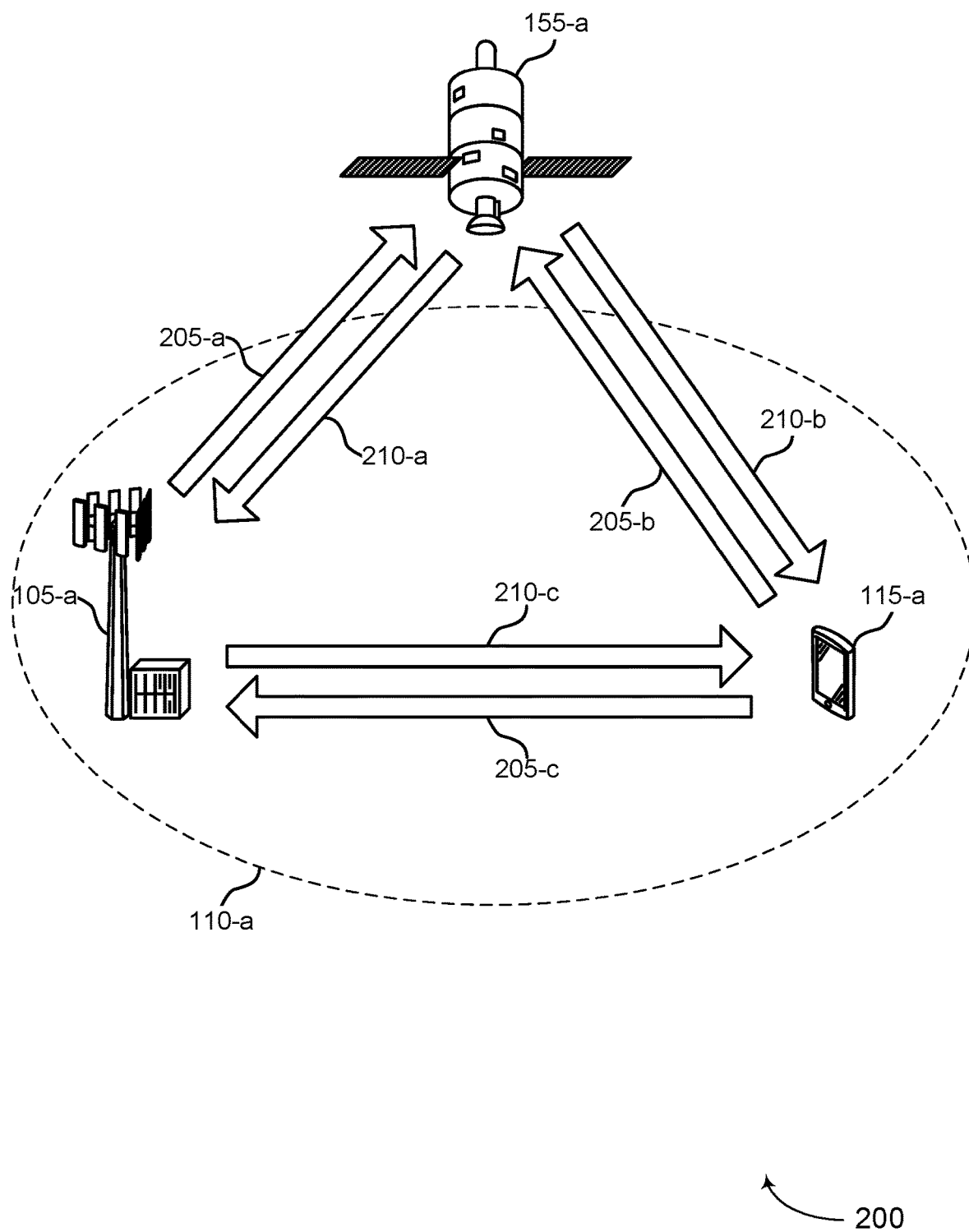
FIG. 2 illustrates an example of a wireless communications system that supports medium access control-control element delay for non-terrestrial networks in accordance with aspects of the present disclosure.

FIG. 2 illustrates an example of a system for wireless communications 200 that supports MAC-CE delay for an NTN in accordance with aspects of the present disclosure. In some examples, the system 200 is an NTN that may implement aspects of the wireless communications system 100. For example, the wireless communications system 200 may include a base station 105-*a*, a user terminal 115-*a*, and a satellite 155-*a*, which may be examples of a base station 105, a user terminal 115, and a satellite 155, as described with reference to FIG. 1.

The wireless communications system 200 may provide a geographic coverage area 110-*a* by using a satellite 155-*a* in communication with one or more of a base station 105-*a* and a user terminal 115-*a*. The base station 105-*a* may therefore serve a geographic coverage area 110-*a* with assistance of, or through, the satellite 155-*a*. In some examples, the base station 105-*a* may not have its own ground geographic coverage area. For example, the base station 105-*a* may communicate directly with the satellite 155-*a* without directly communicating to any ground user terminals, for example, the user terminal 115-*a*. In some examples, the satellite 155-*a* may relay communications between the base station 105-*a* to the user terminal 115-*a*. For example, the user terminal 115-*a* may communicate with the satellite 155-*a* via the base station 105-*a* or vice-versa. In some examples, a ground or terrestrial base station (for example, the base station 105-*a*) may be a gateway. In some such examples, the satellite 155-*a* can itself function as a base station (in other words, can perform scheduling and radio link control, among other operations). An NTN may not, in some examples, include base stations 105-*a* that directly communicate with the user terminal 115-*a* without relaying communications through a satellite 155-*a*. In some other examples, an NTN may be formed of satellites 155-*a* and may not include any base stations 105.

In some examples, the user terminal 115-*a* and the satellite 155-*a* may communicate directly via the uplink 205-*b* and the downlink 210-*b*. Additionally or alternatively, the user terminal 115-*a* and the satellite 155-*a* may communicate indirectly through the base station 105-*a* via the uplink 205-*a* and the downlink 210-*a* between the base station 105-*a* and the satellite 155-*a* as well as via the uplink 205-*c* and the downlink 210-*c* between the base station 105-*a* and the user terminal 115-*a*. In some examples, for communications originating at the user terminal 115-*a* and destined for the base station 105-*a*, the user terminal 115-*a* may transmit an uplink transmission on the uplink 205-*b* to the satellite 155-*a*. The satellite 155-*a* may relay the uplink transmission on the uplink 205-*b* as a downlink transmission on the downlink 210-*a* to the base station 105-*b*.

The user terminal 115-*a* and the satellite 155-*a* may be hundreds or thousands of kilometers apart, and it may take significant time for communications (for example, electromagnetic waves) to propagate over the distance between the user terminal 115-*a* and the satellite 155-*a* or between the satellite 155-*a* and the base station 105-*a*, or both. The distance that a transmission travels may increase the propagation delay of a transmission or RTD associated with the transmission. The propagation delay may refer to a duration it takes for a signal to travel from its source to its intended recipient. A channel delay may refer to a duration it between when a first bit of a transmission leaves the transmitter until the last bit of the transmission is received by the receiver and may account for the propagation delay of a transmission. The RTD may refer to a duration it takes for a transmission to be transmitted from a source to its intended recipient, processed by the intended recipient, and receive a response transmitted from the intended recipient of the transmission back at the source. Thus, an RTD may account for the propagation delays and channel delays among other things. For example, the propagation delays for NTNs may be many orders of magnitude larger than the propagation delays for terrestrial networks. As such, the RTDs associated with a transmission may also be orders of magnitude larger for NTNs than for terrestrial networks. RTDs may also be affected by the Doppler effect and chip duration expansion or shrinkage at the user terminal 115-*a*. For example, high speeds of non-geostationary satellites, for example, such as the satellite 155, may result in frequency shifts (for example, Doppler offsets) due to the Doppler effect. Also, the channel delay and the RTD may change over time when the satellite 155 or the user terminal 115-*a* moves.

Further, the channel delays experienced by the user terminal 115-*a* may be different between the same user terminal 115-*a* to different satellites 155. The channel delays are generally different for different user terminals 115-*a* in the same network that are connected to one or more of the same beams, the same satellite 155, or different beams and different satellites 155.

By way of example, the satellite 155 may be in an orbit, such as low earth orbit, medium earth orbit, or non-geostationary earth orbit. In any of these examples, the satellite 155-a may be many thousands of kilometers (km) from earth, and therefore may be thousands of kilometers from the base station 105-a and the user terminal 115-a. Each transmission on the uplinks 205 or the downlinks 210 between the satellite 155-a and the base station 105-a or the user terminal 115-a may therefore travel the distance from earth to the satellite 155-a. If the satellite 155 is in a low earth orbit, the satellite 155 may be between about 600 km-2,000 km from earth. If the satellite 155 is in a medium earth orbit, the satellite 155 may be between about 2,000 km-35,786 km from earth. If the satellite 155 is in a geosynchronous earth orbit, the satellite 155 may be between about 35,786 km-36,000 km from earth.

The user terminal 115-a may support a MAC-CE delay. A MAC-CE delay may refer to a time between when the user terminal 115-a receives a MAC-CE command, from the satellite 155-a (for example, directly or indirectly via the base station 105-a), and when the user terminal 115-a begins implementing one or more changes indicated by or based on the MAC-CE command. The user terminal 115-a may report, over the uplink 205-b, a HARQ ACK to the NTN to indicate that the MAC-CE command was received. The user terminal 115-a may start to follow the configuration indicated by the MAC-CE command after the MAC-CE delay the user terminal 115-a sends to the HARQ-ACK to the satellite 155-a. The MAC-CE delay may account for the physical layer (PHY) to MAC layer internal inter-layer delay in the user terminal 115-a and optionally in the satellite 155-a. Additionally or alternatively, the MAC-CE delay may account for the propagation delay between the user terminal 115-a and the satellite 155-a, directly or indirectly via the base station 105-a. Specifically, among other factors, the MAC-CE delay may account for the propagation delay of the HARQ ACK to arrive at the satellite 155-a.

A MAC-CE command for communication, such as downlink communication from the satellite 155-a or uplink communication to the satellite 155-a, may be received at the user terminal 115-a, and the user terminal 115-a may respond with a feedback communication, such as a HARQ feedback message (for example a HARQ ACK), to indicate whether the MAC-CE command was received. The user terminal 115-a and the satellite 155-a may follow the MAC-CE command for a new downlink communication behavior or a new uplink communication behavior after the MAC-CE delay. For example, the user terminal 115-a and the satellite 155-a may follow a new CSI timing or RS resource configuration. The user terminal 115-a and the satellite 155-a are to implement the MAC-CE command at a similar time or a same time, which is one purpose of the MAC-CE delay. For example, implementing a change based on the MAC-CE command too early may result in a delay in the satellite 155-a receiving the feedback, which may result in the satellite 155-a and the user terminal 115-a incorrectly communicating using a previous timing or resource configuration. In some examples, the MAC-CE delay may be defined for the user terminal 115-a with respect to when the user terminal 115-a receives the MAC-CE command or when the user terminal 115-a transmits the feedback in response to the MAC-CE command. In some examples, the MAC-CE delay may be defined for the satellite 155-a with respect to when the satellite 155-a receives the MAC-CE command feedback from the user terminal 115-a in response to the MAC-CE command.

The MAC-CE delay may be determined in one or more ways. For example, the MAC-CE delay may be defined for the NTN regardless of the type of platform, such that a user terminal 115-a in communication with one or more of a LEO satellite, a MEO satellite, a GEO satellite, or a HAP satellite 155 may use a same MAC-CE delay for each satellite 155 independent of the satellite type, such as a fixed value of 6 milliseconds. This option may, in some examples, be configured semi-statically.

Alternatively, different MAC-CE delays may be defined for different types of platforms associated with one or more satellites, such that LEO and GEO satellites, for example, may each have a different MAC-CE delay. The user terminal 115-a may be designed for communication with a limited number of satellite 155 types, and thus, may know the type of satellite that it is configured to communicate with implicitly. Additionally or alternatively, the satellite type may be explicitly signaled to the user terminal 115-a, for example, in the satellite's broadcast constellation information. This option may also be configured semi-statically.

In some other examples, the MAC-CE delay may be determined based on one or more orbit altitudes (for example, a highest point or an average or other relevant orbit parameter) of one or more satellites 155. In some examples, the MAC-CE delay may be based on a worst case scenario that results in the largest channel delay between any user terminal 115-a and its serving satellite 155. For example, the MAC-CE delay may be based on a projection or calculation, or based on historically measured data, or both, over time. In some examples, the orbit may be known based on the satellite's orbit model, or the orbit may be measured to determine the average channel delay or the worst determined channel delay. This option may also be configured semi-statically.

Additionally or alternatively, a MAC-CE delay may be defined on an individual user terminal 115 basis. For example, a device, such as the satellite 155-a, may determine one or more characteristics or operating parameters associated with different devices, such as different user terminals 115, and may determine a MAC-CE delay for each of the different devices. For example, the satellite 155-a may measure the channel delays of channels established with individual user terminals 115, including user terminal 115-a, based on an RTD associated with each of the user terminals 115. In some examples, the satellite 155-a may determine the MAC-CE delays for the different user terminals 115 based on the measured RTDs to the respective user terminals 115. In some examples, the satellite 155-a may also determine the MAC-CE delays based further on other device-specific delays. The satellite 155-a may signal the MAC-CE delay to each user terminal 115, for example, when the channel delay changes more than a threshold amount (for example, aperiodically) or according to a schedule configured at the satellite 155-a and the user terminal 115-a (for example, periodically). This may result in dynamically updating the MAC-CE delay for a user terminal 115-a when the channel delay changes. For example, the MAC-CE delay may be updated when the satellite 155-a determines a different MAC-CE delay at a different time accounting for a different channel delay. In some examples, the difference between the previous MAC-CE delay and the updated MAC-CE delay may be above a threshold, the difference between the previous channel delay and the different channel delay may be above a threshold, or both.

Different MAC-CE delays may be defined different types of satellites 155. For example, for a bent-pipe transponder satellite 155 (also known as a repeater) and a regenerative transponder satellite 155 when other conditions are the same or similar (for example, satellite type or orbit parameters). The channel delay for a bent pipe satellite 155 may be larger than the channel delay of a regenerative satellite 155 in the same orbit, for example, because the channel delay for a bent pipe satellite 155 may include both the satellite 155 to base station 105 delay and satellite 155 to user terminal 115 delay. Therefore, when the satellite 155 is operating as a bent pipe transponder or a regenerative transponder, different MAC-CE delays may be defined.

Figure 3:
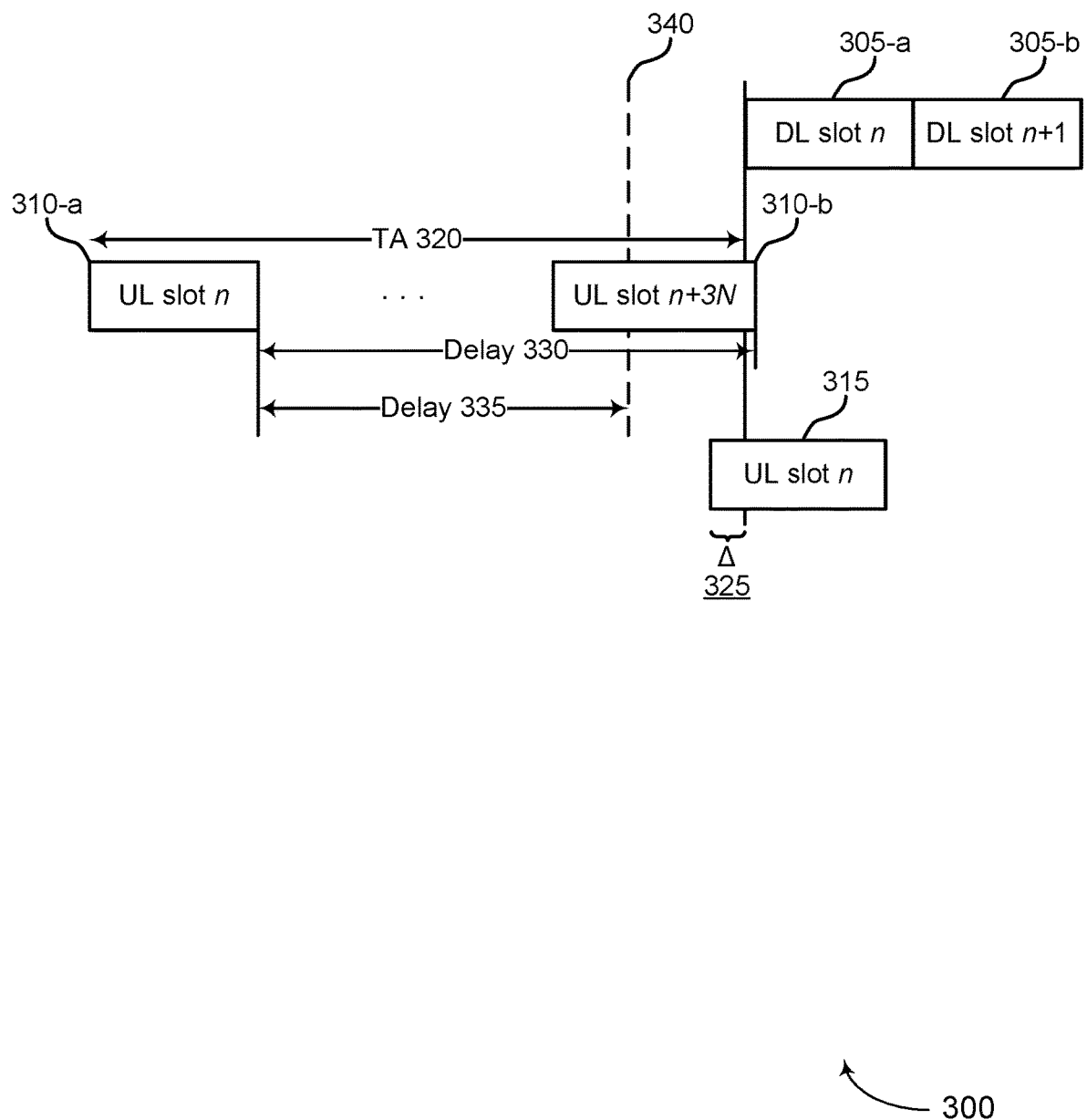
FIG. 3 illustrates an example of a timeline that supports medium access control-control element delay for non-terrestrial networks in accordance with aspects of the present disclosure.

FIG. 3 illustrates an example of a timeline 300 that supports MAC-CE delay for an NTN in accordance with aspects of the present disclosure. In some examples, the timeline 300 may be implemented by aspects of the wireless communications system 100 and 200. For example, the timeline 300 may be implemented by a base station 105, a user terminal 115, and a satellite 155 as described with reference to FIGS. 1 and 2.

In timeline 300, time may proceed from left to right. Timeline 300 may include the uplink (UL) slot n 310-*a* and the UL slot $n+3N_{slot,UL}^{subframe}$ 310-*b* at a user terminal 115 as well as the UL slot n 315 at a satellite 155 or a base station 105. Timeline 300 may also include the downlink (DL) slot n 305-*a* and the DL slot n+1 305-*b* for the user terminal 115 and the satellite 155 and optionally the base station 105. A HARQ ACK may be received by the satellite 155 immediately prior to the UL slot n 310-*a* in response to a MAC-CE command. TA 320 may begin when the HARQ ACK is received and delay 330 and delay 335 may begin at the end of UL slot n 310-*a*. In some examples, TA 320 may end at the beginning of DL slot n 305-*a* while delay 330 and delay 335 may end at the end of the UL slot $n+3N_{slot,UL}^{subframe}$ 310-*b* and time 340, respectively. The MAC-CE command that resulted in the HARQ ARK may be implemented for the user terminal 115 and the satellite 155 at one slot after the delay 330 (for example, DL slot n+1 305-*b*) or delay 335. In some examples, however, delay 335 (for example, 3 millisecond) may not be long enough to ensure the satellite may receive the HARQ ACK and implement the MAC-CE command in time to match when the user terminal implements the MAC-CE command.

In some examples, it may be difficult to map a time duration, such as 5 milliseconds, to a number or fractional number of slots because the mapping relies on the Doppler effect, and the estimate of the Doppler offsets may be different at the user terminal 115 and the satellite 155. This may result in a mismatch of a first slot in which MAC-CE command starts to take effect at the user terminal 115 and the satellite 155. For example, the user terminal 115 may start to follow the MAC-CE command for the DL slot n 305-*a*, while the satellite 155 may start to follow the MAC-CE command for the DL slot n+1 305-*b* based on reception timing of the HARQ feedback. Thus, in some examples, a slot number (for example, a slot number for which the MAC-CE command changes may take effect) may be used to represent the MAC-CE delay or a portion thereof. For example, if a HARQ ACK is transmitted in the UL slot n 310-*a*, the new user terminal uplink or downlink behavior may take effect from the first uplink or downlink slot after the UL slot $n+3N_{slot,UL}^{subframe}$ 310-*b*, such as DL slot n+1 305-*b*.

Once the satellite 155 receives the HARQ ACK for the MAC-CE command, the satellite 155 may apply the MAC-CE delay, delay 330, to get the first slot in which the command takes effect, for example, DL slot n+1 305-*b*. For a MAC-CE command associated with an user terminal 115 UL transmission, if HARQ ACK is received in UL slot n 310-*a*, the MAC-CE command may take effect from the first UL slot after UL slot $n+3N_{slot,UL}^{subframe}$ 310-*b*, such as, UL slot $n+3N_{slot,UL}^{subframe}+1$. For a MAC-CE command associated with a user terminal 115 DL transmission, the base station may first reconstruct the UL and DL slot relationship based on the total timing advance (TA) at the user terminal 115, and then applies the MAC-CE delay.

The TA 320 is shown to include the delay 330. A TA offset, Δ 325 may be the timing offset between UL slot n 315 at the satellite 155 and DL slot n 305-*a*. For example, Δ may equal 0 for FDD, and Δ may be greater than 0 for TDD. The TA 320 less Δ 325 may be set to be close to round trip time (RTT) to align different user terminal's 115 uplink at the satellite 155. The user terminal 115 and the satellite 155 may both know TA 320, therefore, there may be no slot mismatch when the MAC-CE command starts to take effect in DL slot n+1 305-*b*.

In an NTN, a channel may have very large propagation delays relative to terrestrial channels. By the time the satellite 155 receives HARQ ACK in UL slot n 310-*a*, the satellite 155 may have already missed the first DL slot in which the MAC-CE command is supposed to be applied to the DL. For example, when the delay 335 is used by the user terminal 115 such that the user terminal 115 begins to follow the MAC-CE command at time 340 before the satellite 155 begins to follow the MAC-CE command at DL slot n+1 305-*b*. Thus, a mismatch in DL slot n 305-*a* may occur. Delay 330 may be used over delay 335 for proper MAC-CE command implementation timing. In some examples, if the TA 320 increases further, then the user terminal 115 will expect the MAC-CE command has taken effect in the DL slot n 305-*a* before the UL slot n 315 in which the satellite 155 receives the HARQ ACK from the user terminal 115. The condition for the timeline 300 to work with delay 335 corresponds to a user terminal 115 to a base station 105 distance that is no larger than about 450 km. NTNs often have a distance between a user terminal 115 to a satellite 155 much greater than 450 km.

Delay 330 may be longer than delay 335. Delay 335 may be used in terrestrial systems with low channel delay relative to NTNs. Delay 330 may be long enough to at least meet TA 320 is less than the combination of delay 330 and an uplink slot duration. The TA 320 may be determined by the channel delay between the user terminal 115 and the satellite 155. The increased delay 330 may also account for other delay such as PHY to MAC communication delay. The delay 330 may be an expressed (for example, in the MAC-CE command or otherwise) as a time offset (for example, greater than 4 milliseconds). For example, the time offset may be or indicate N milliseconds or M slots from transmission of or reception of the HARQ ACK. Alternatively, the delay 330 may be an expressed (for example, in the MAC-CE command or otherwise) as a specific slot number. For example, the slot number may be or may indicate a slot for the MAC-CE command to take effect at the user terminal 115 with respect to the slot in which the MAC-CE command is received in. In some examples, the slot number may potentially be in the same frame or a later frame, among other examples. Thus, communications in or after the slot corresponding to the slot number may be in accordance with the MAC-CE command. For example, if a MAC-CE command is received in slot X (for example, slot 2), the delay 330 may indicate that the MAC-CE command may take effect at slot X+4 (for example, slot 6).

Figure 4:
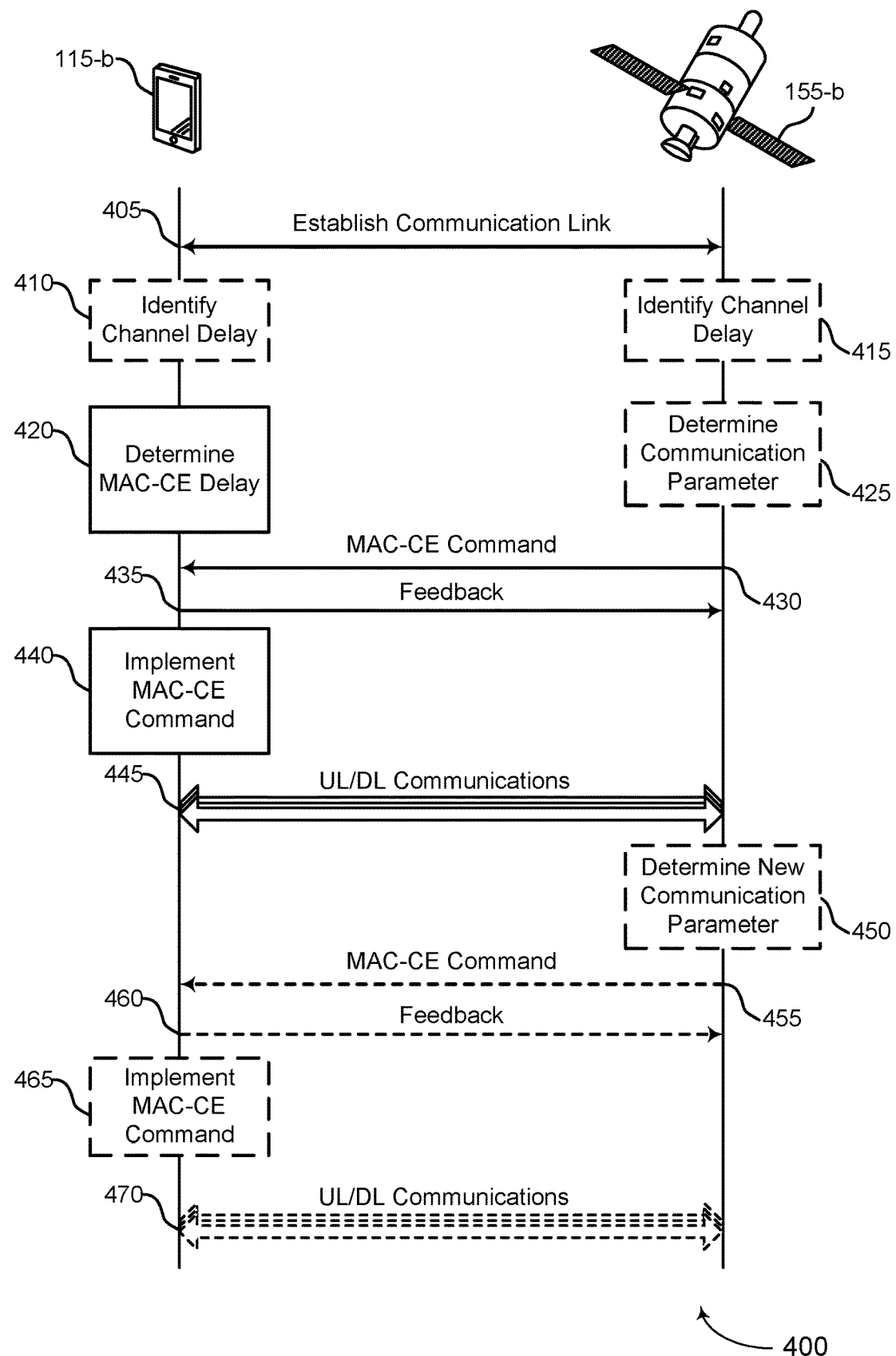
FIG. 4 illustrates an example of a process flow that supports medium access control-control element delay for non-terrestrial networks in accordance with aspects of the present disclosure.

FIG. 4 illustrates an example of a process flow 400 that supports MAC-CE delay for an NTN in accordance with aspects of the present disclosure. In some examples, the process flow 400 may be implemented by aspects of the wireless communications system 100 and 200. The process flow 400 may include a user terminal 115-*b* and a satellite 155-*b*, which may be examples of a user terminal 115 and a satellite 155 as described with reference to FIGS. 1-3. In the following description of the process flow 400, the information communicated between the user terminal 115-*b* and the satellite 155-*b* may be communicated in a different order than the example order shown, or the operations performed by the user terminal 115-*b* and the satellite 155-*b* may be performed in different orders or at different times. Some operations may also be omitted from the process flow 400, and other operations may be added to the process flow 400. In the example of FIG. 4, the user terminal 115-*b* and the satellite 155-*b* may be in communication with each other via an NTN.

At 405, the user terminal 115-*b* and the satellite 155-*b* may establish a communication link over a channel.

At 410, the user terminal 115-*b* may optionally identify a channel delay in the non-terrestrial network (for example, based on a measured RTD). The user terminal 115-*b* may determine an indication of the channel delay that is based on one or more of a location of a satellite (for example, satellite 155-*b*) in the non-terrestrial network, a location of a beam of the satellite, or a location of the user terminal 115-*b*, among other factors or conditions.

At 415, the satellite 155-*b* may optionally identify a channel delay in the non-terrestrial network. The satellite 155-*b* may determine an indication of the channel delay that is based on one or more of a location of a satellite (for example, satellite 155-*b*) in the NTN, a location of a beam of the satellite, or a location of the user terminal 115-*b*, among other factors or conditions. The satellite 155-*b* may, in some examples, use the channel delay to determine the MAC-CE delay for communication with the user terminal 115-*b* in the NTN.

The satellite 155-*b* may transmit an indication of the MAC-CE delay. The satellite 155-*b* may transmit the indication of the delay in one or more of a broadcast configuration messages, a group configuration message (for example, a message configured for a group of user terminals 115), or a dedicated configuration message (for example, a message configured for one user terminal 115). In some examples, the satellite 155-*b* may transmit to the user terminal 115-*b* an indication of the channel delay that is based on one or more of a location of a satellite (for example, satellite 155-*b*) in the NTN, a location of a beam of the satellite, or a location of the user terminal.

At 420, the user terminal 115-*b* may determine, for example based on the channel delay, the delay associated with a MAC-CE for communication in the NTN.

In some examples, the user terminal 115-*b* may determine the MAC-CE delay based on determining the indication of the channel delay. In some examples, the user terminal 115-*b* may determine the MAC-CE delay before establishing the communication link with the satellite 155-*b*. For example, the MAC-CE may be defined and configured at the user terminal 115-*b* based on the type of the platform or the orbit altitude of the platform, among other examples. The user terminal 115-*b* may determine the MAC-CE delay based on a configuration of a plurality of delays stored by the user terminal 115-*b*. For example, the user terminal 115-*b* may have a stored table of delay values.

In some examples, the satellite 155-*b* may optionally determine the MAC-CE delay based on the channel delay. The satellite 155-*b* may transmit, and the user terminal 115-*b* may receive the MAC-CE delay (for example, before 420 or in MAC-CE command 430), as discussed with respect to FIG. 5. For example, the user terminal 115-*b* may receive the MAC-CE delay in one or more of a broadcast configuration message, a user terminal group configuration message, or a dedicated configuration message, and the configuration message may be sent per satellite, per cell, or per beam.

The user terminal 115-*b* may determine the MAC-CE delay is greater than one or more of the channel delays, a slot duration, or an internal inter-layer delay. In some examples, the user terminal 115-*b* may determine the MAC-CE delay is greater than 3 milliseconds and based on an internal inter-layer delay comprising a communication delay between a physical layer and a medium access control layer. The MAC-CE delay may comprise a time offset such as N milliseconds or M slots associated with transmitting the feedback, in which communicating after the end of the delay comprises communicating after an end of the time offset. The MAC-CE delay may include an indication of a slot number associated with the communication parameter of the MAC-CE command, in which communicating after the end of the delay comprises communicating in or after a slot corresponding to the slot number.

In some examples, the user terminal 115-*b* may determine the MAC-CE delay independent of a type of a satellite (for example, satellite 155-*b*) in the NTN. The user terminal 115-*b* may also determine the MAC-CE delay based on determining the type of a satellite (for example, satellite 155-*b*) of the NTN. The MAC-CE delay may be based on determining the orbit of a satellite (for example, satellite 155-*b*). Determining the MAC-CE delay may be based on the orbit of the satellite may include accounting for a highest orbit altitude of the satellite or an average orbit altitude of the satellite, among other conditions.

At 425, the satellite 155-*b* may optionally determine a communication parameter (for example, a new CSI timing or RS resource configuration). At 430, the satellite 155-*b* may transmit a MAC-CE command to the user terminal 115-*b* indicating the communication parameter. The satellite 155-*b* may transmit an indication of the MAC-CE delay. The satellite 155-*b* may transmit the indication of the delay in one or more of a broadcast configuration messages, a group configuration message, or a dedicated configuration message. In some examples, the satellite 155-*b* may transmit to the user terminal 115-*b* an indication of the channel delay that is based on one or more of a location of a satellite (for example, satellite 155-*b*) in the NTN, a location of a beam of the satellite, or a location of the user terminal 115-*b*.

At 435, the user terminal 115-*b* may transmit feedback (for example, HARQ ACK) to the satellite 155-*b* based on the MAC-CE command.

At 440, the user terminal 115-*b* may implement a change or adjustment based on the MAC-CE command that indicates the communication parameter. For example, the user terminal 115-*b* may update the frequency resources used for sounding RSs (SRSs), or the user terminal 115-*b* may increase the periodicity of CSI reports.

At 445, the user terminal 115-*b* and the satellite 155-*b* may communicate (for example, uplink and downlink transmissions directly between the user terminal 115-*b* and the satellite 155-*b* in the NTN) with the NTN over the channel according to the communication parameter after an end of a delay associated with a MAC-CE. The user terminal 115-*b* may determine a timing advance based on the channel delay to communicate with the NTN. In some examples, the user terminal 115-*b* may determine a second delay associated with a second MAC-CE for communication in the NTN, in which the second delay is different than the previous delay.

The user terminal 115-b and the satellite 155-b may communicate with the NTN over the channel according to the communication parameter after an end of the second delay.

At 450, the satellite 155-b may optionally determine a second communication parameter (for example, a new CSI timing or RS resource configuration). At 455, the satellite 155-b may optionally transmit a MAC-CE command to the user terminal 115-b indicating the new communication parameter, similar to the MAC-CE command transmission at 435.

At 460, the user terminal 115-b may optionally transmit feedback (for example, HARQ ACK) based on the MAC-CE command. The MAC-CE delay may comprise a time offset such as N milliseconds or M slots associated with transmitting the feedback, in which communicating after the end of the delay comprises communicating after an end of the time offset. The MAC-CE delay may include an indication of a slot number associated with the communication parameter of the MAC-CE command, in which communicating after the end of the delay comprises communicating in or after a slot corresponding to the slot number. At 465, the user terminal 115-b may optionally implement a change or adjustment based on the MAC-CE command that indicates the communication parameter, similar to the implementation at 440.

At 470, the user terminal 115-b and the satellite 155-b may optionally communicate (for example, uplink and downlink transmissions) with the NTN over the channel according to the communication parameter after the MAC-CE delay.

Figure 5:
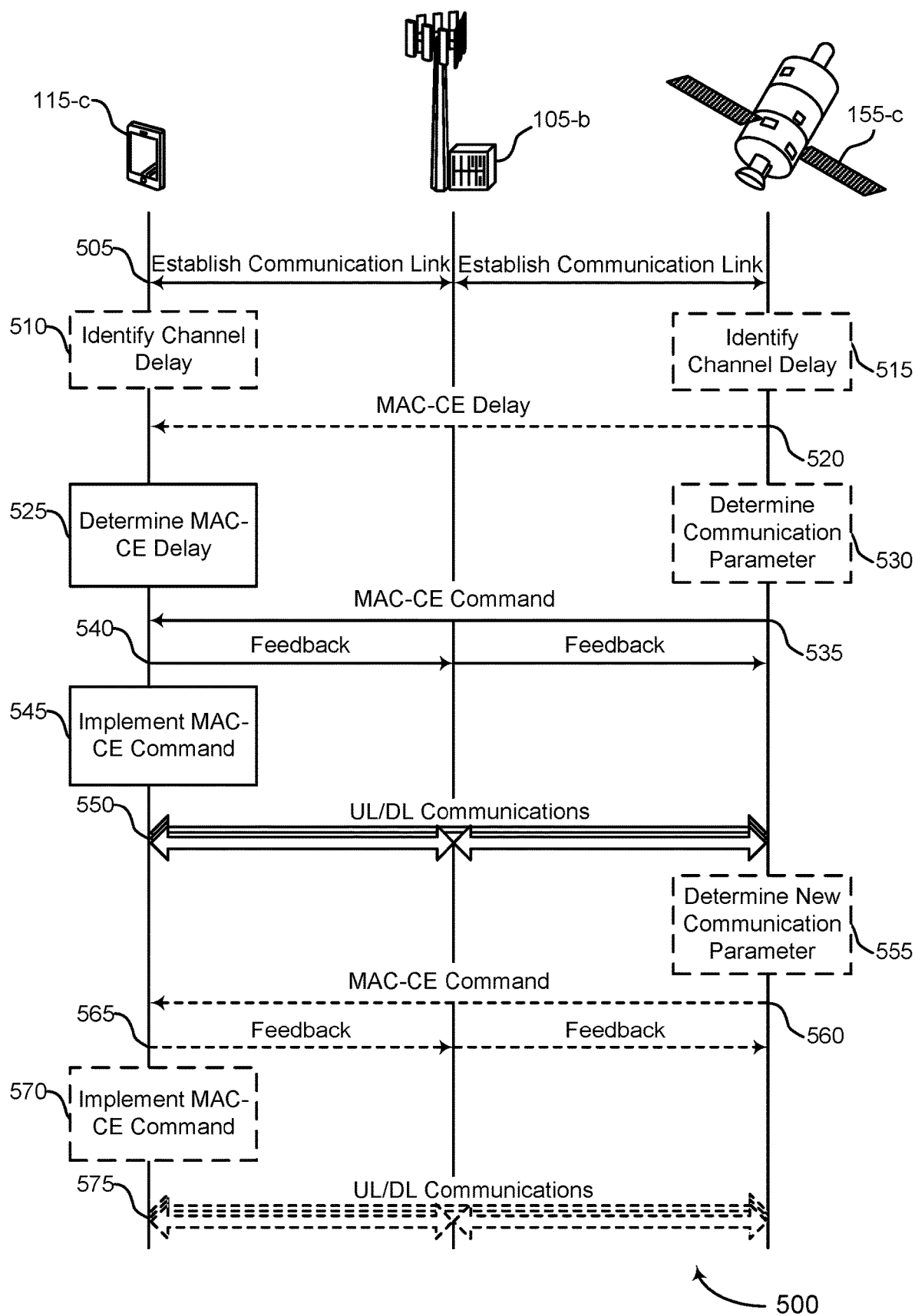
FIG. 5 illustrates an example of a process flow that supports medium access control-control element delay for non-terrestrial networks in accordance with aspects of the present disclosure.

FIG. 5 illustrates an example of a process flow 500 that supports MAC-CE delay for an NTN in accordance with aspects of the present disclosure. In some examples, the process flow 500 may be implemented by aspects of the wireless communications system 100 and 200. The process flow 500 may include a base station 105-b, a user terminal 115-c, and a satellite 155-c, which may be examples of a base station 105, a user terminal 115, and a satellite 155 as described with reference to FIGS. 1 and 2. In the following description of the process flow 500, the operations between the base station 105-b, the user terminal 115-c, and the satellite 155-c may be transmitted in a different order than the example order shown, or the operations performed by the base station 105-b, the user terminal 115-c, and the satellite 155-c may be performed in different orders or at different times. Some operations may also be omitted from the process flow 500, and other operations may be added to the process flow 500. In the example of FIG. 5, the base station 105-b, the user terminal 115-c, and the satellite 155-c may be in communication with each other via a NTN.

At 505, the user terminal 115-c and the satellite 155-c may establish a communication link over a channel via an intermediate base station 105-b.

At 510, the user terminal 115-c may optionally identify a channel delay in the NTN (for example, based on a measured RTD). The user terminal 115-c may determine an indication of the channel delay that is based on one or more of a location of a satellite (for example, satellite 155-c) in the NTN, a location of a beam of the satellite, or a location of the user terminal 115-c, among other factors or conditions.

At 515, the satellite 155-c may optionally identify a channel delay in the NTN. The satellite 155-c may determine an indication of the channel delay that is based on one or more of a location of a satellite (for example, satellite 155-c) in the NTN, a location of a beam of the satellite, or a location of the user terminal 115-c, among other factors or conditions. The satellite 155-c may use the channel delay to determine the MAC-CE delay for communication specific to the user terminal 115-c in the NTN. The MAC-CE delay may comprise a time offset such as N milliseconds or M slots associated with transmitting the feedback, in which communicating after the end of the delay comprises communicating after an end of the time offset.

At 520, the satellite 155-c may optionally transmit the MAC-CE delay to the user terminal 115-c. For example, the satellite 155-c may send the MAC-CE delay to the user terminal 115-c either in a broadcast configuration message, for example a SIB, a UE group configuration message, for example in RRC or a downlink control channel, or a dedicated configuration message, for example in downlink control information (DCI). The configuration message may be sent on a satellite basis, cell basis, or a beam basis.

At 525, the user terminal 115-c may determine based on the channel delay, a delay associated with a MAC-CE for communication in the NTN. In some examples, the user terminal 115-c may determine the MAC-CE delay based on determining the indication of the channel delay. The user terminal 115-c may receive an indication of the MAC-CE delay in a delay configuration, in which the delay may be determined based on receiving the indication of the delay. In some examples, the user terminal 115-c may receive the indication of the delay in one or more of a broadcast configuration messages, a group configuration message, or a dedicated configuration message. In other cases, the user terminal 115-c may receive the indication of the delay indication of the delay on one or more of a satellite of the NTN basis, a beam of the satellite basis, or a cell of the NTN basis. The MAC-CE delay may comprise a time offset such as N milliseconds or M slots associated with transmitting the feedback, in which communicating after the end of the delay comprises communicating after an end of the time offset. The MAC-CE delay may include an indication of a slot number associated with the communication parameter of the MAC-CE command, in which communicating after the end of the delay comprises communicating in or after a slot corresponding to the slot number.

In some examples, the user terminal 115-c may determine the MAC-CE delay before establishing the communication link. The user terminal 115-c may determine the MAC-CE delay based on a configuration of a plurality of delays stored by the user terminal 115-c. The user terminal 115-c may determine the MAC-CE delay is greater than one or more of the channel delays, a slot duration, or an internal inter-layer delay. In some examples, the user terminal 115-c may determine the MAC-CE delay is greater than 3 milliseconds and based on an internal inter-layer delay comprising a communication delay between a physical layer and a medium access control layer.

In some examples, the user terminal 115-c may determine the MAC-CE delay independent of a type of a satellite (for example, satellite 155-c) in the NTN. The user terminal 115-c may also determine the MAC-CE delay based on determining the type of a satellite (for example, satellite 155-c) of the NTN. The MAC-CE delay based on determining the orbit of a satellite (for example, satellite 155-c). The orbit of the satellite 155-c may include a highest orbit altitude of the satellite 155-c or an average orbit altitude of the satellite 155-c.

At 530, the satellite 155-c may optionally determine a communication parameter (for example, a new CSI timing or RS resource configuration).

At 535, the satellite 155-c may transmit a MAC-CE command to the user terminal 115-c indicating the communication parameter. The satellite 155-c may transmit an indication of the MAC-CE delay. The indication of the delay may be transmitted in one or more of a broadcast configuration messages, a group configuration message, or a dedicated configuration message. In some examples, the satellite 155-c may transmit to the user terminal 115-c an indication of the channel delay that is based on one or more of a location of the satellite 155-c in the NTN, a location of a beam of the satellite 155-c, or a location of the user terminal 115-c.

At 540, the user terminal 115-c may transmit feedback (for example, HARQ ACK) to the base station 105-b which may transmit the feedback to the satellite 155-c based on the MAC-CE command.

At 545, the user terminal 115-c may implement a change or adjustment based on the MAC-CE command that indicates the communication parameter. For example, the user terminal 115-b may update the frequency resources used for sounding RSs (SRSs), or the user terminal 115-b may increase the periodicity of CSI reports.

At 550, the user terminal 115-c and the satellite 155-c may communicate (for example, uplink and downlink transmissions directly between the user terminal 115-c and the satellite 155-c in the NTN) with the NTN over the channel according to the communication parameter after an end of a delay associated with a MAC-CE. The base station 105-b may communicate with the satellite 155-c and the user terminal 115-c. The user terminal 115-c may determine a timing advance based on the channel delay to communicate with the NTN. In some examples, the user terminal 115-c may determine a second delay associated with a second MAC-CE for communication in the NTN, in which the second delay is different than the previous delay. The user terminal 115-c and the satellite 155-c may communicate with the NTN over the channel according to the communication parameter after an end of the second delay.

At 555, the satellite 155-c may optionally determine a new communication parameter (for example, a new CSI timing or RS resource configuration). At 555, the satellite 155-c may transmit a MAC-CE command to user terminal 115-c indicating the new communication parameter, similar to the MAC-CE command transmission at 535.

At 565, the user terminal 115-c may optionally transmit feedback (for example, HARQ ACK) based on the MAC-CE command to the base station 105-b which may relay the feedback to the satellite 155-c.

At 570, the user terminal 115-c may optionally implement a change or adjustment based on the MAC-CE command that indicates the communication parameter, similar to the implementation at 545.

At 575, the user terminal 115-c and the satellite 155-c may optionally communicate (for example, uplink and downlink transmissions directly between the user terminal 115-c and the satellite 155-c in the NTN) with the NTN over the channel according to the communication parameter after an end of a delay associated with a MAC-CE. The base station 105-b may communicate with the satellite 155-c and the user terminal 115-c.

Figure 6:
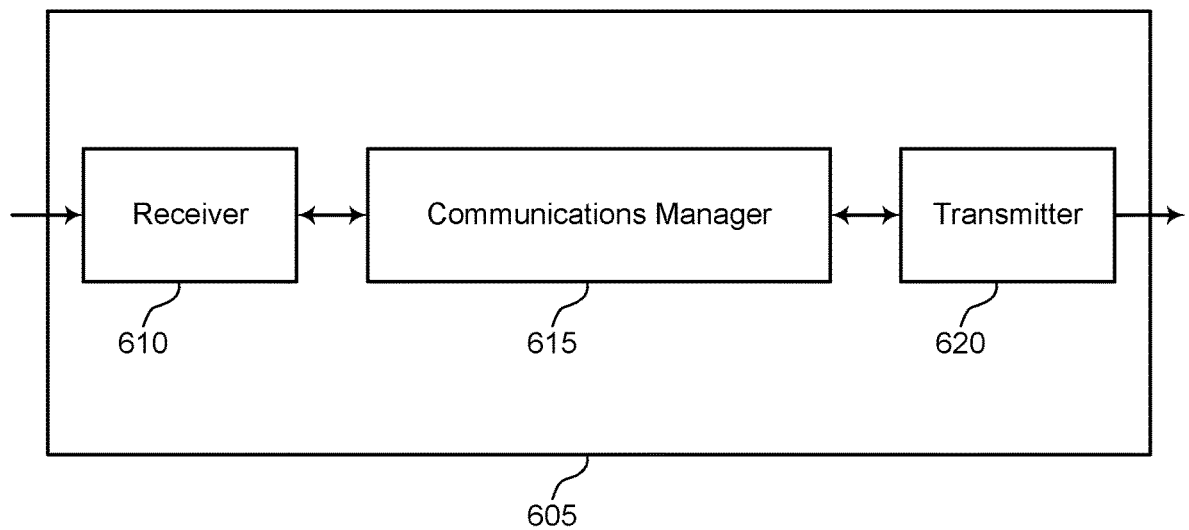
FIGS. 6 and 7 show block diagrams of devices that support medium access control-control element delay for non-terrestrial networks in accordance with aspects of the present disclosure.

FIG. 6 shows a block diagram of a device 605 that supports MAC-CE delay for an NTN in accordance with aspects of the present disclosure. The device 605 may be an example of aspects of a user terminal 115 as described herein. The device 605 may include a receiver 610, a communications manager 615, and a transmitter 620. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to MAC-CE delay for an NTN). Information may be passed on to other components of the device 605. The receiver 610 may be an example of aspects of the transceiver 920 described with reference to FIG. 9. The receiver 610 may utilize a single antenna or a set of antennas.

The communications manager 615 may establish a communication link over a channel having a channel delay in the NTN, determine, based on the channel delay, a delay associated with a MAC-CE for communication in the NTN, receive a MAC-CE command indicating a communication parameter, transmit feedback based on the MAC-CE command, and communicate with the NTN over the channel according to the communication parameter after an end of the delay. The communications manager 615 may be an example of aspects of the communications manager 910 described herein.

The actions performed by the communications manager 615 as described herein may be implemented to realize one or more potential advantages. One implementation may allow a user terminal 115 to reduce latency and thus save power and increase battery life by avoiding mismatched timing of implementing a MAC-CE command when a satellite 155 associated with the cell serving the UE has yet to receive feedback for the MAC-CE command or implement the MAC-CE command. Another implementation may provide improved quality and reliability of service at the user terminal's 115 processor, as latency and the number of separate resources allocated to the UE 115 may be reduced due to sufficient delay for a satellite 155 to receive a user terminal's 115 feedback over a channel with large delay.

The communications manager 615, or its sub-components, may be implemented in hardware, code (for example, software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at different locations, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
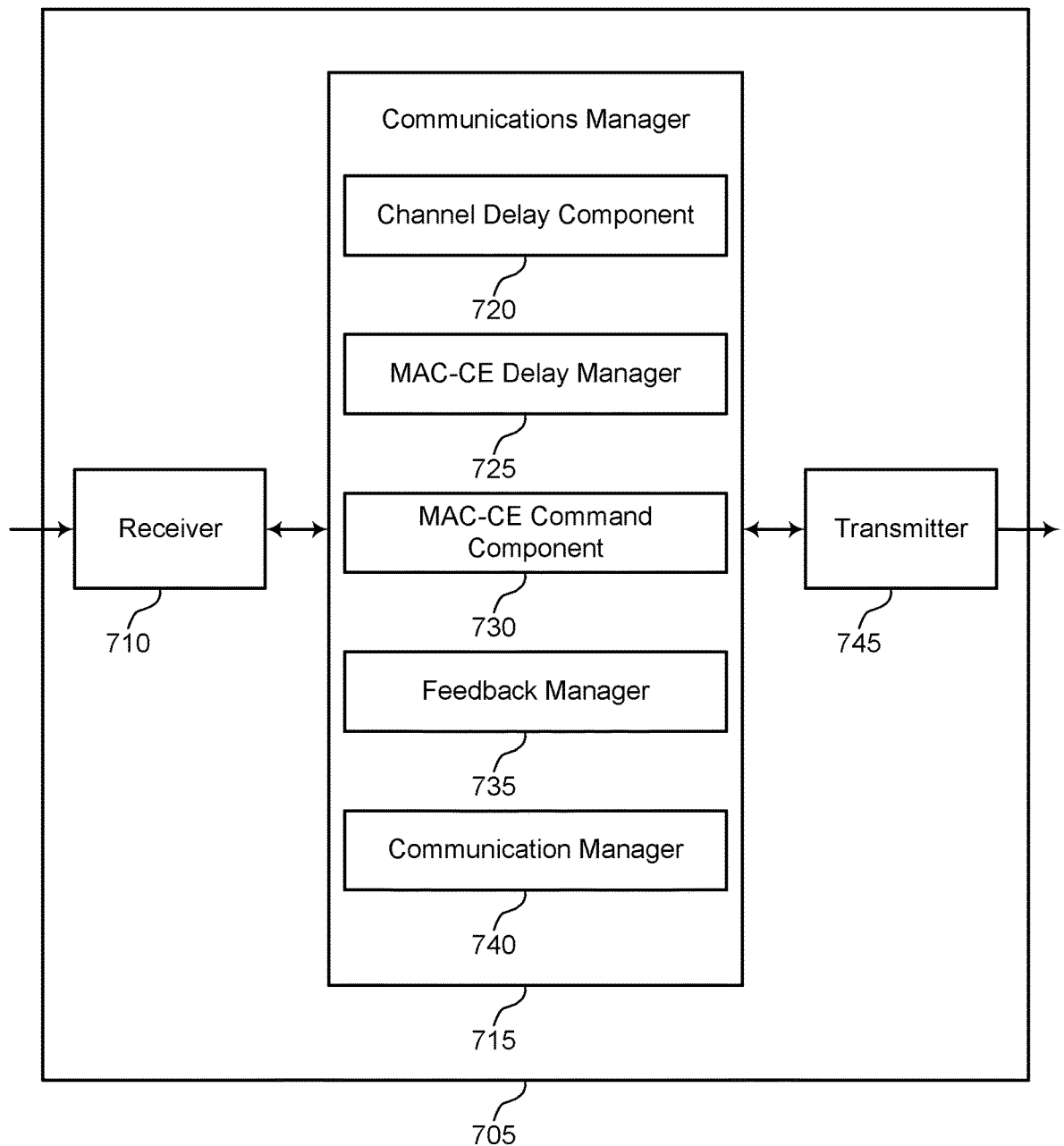

FIG. 7 shows a block diagram of a device 705 that supports MAC-CE delay for an NTN in accordance with aspects of the present disclosure. The device 705 may be an example of aspects of a device 605, or a user terminal 115 as described herein. The device 705 may include a receiver 710, a communications manager 715, and a transmitter 745. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to MAC-CE delay for an NTN). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a channel delay component 720, a MAC-CE delay manager 725, a MAC-CE command component 730, a feedback manager 735, and a communication manager 740. The communications manager 715 may be an example of aspects of the communications manager 910 described herein.

The channel delay component 720 may establish a communication link over a channel having a channel delay in the NTN. The MAC-CE delay manager 725 may determine, based on the channel delay, a delay associated with a MAC-CE for communication in the NTN. The MAC-CE command component 730 may receive a MAC-CE command indicating a communication parameter.

The feedback manager 735 may transmit feedback based on the MAC-CE command. The communication manager 740 may communicate with the NTN over the channel according to the communication parameter after an end of the delay.

The transmitter 745 may transmit signals generated by other components of the device 705. In some examples, the transmitter 745 may be collocated with a receiver 710 in a transceiver component. For example, the transmitter 745 may be an example of aspects of the transceiver 920 described with reference to FIG. 9. The transmitter 745 may utilize a single antenna or a set of antennas.

Figure 8:
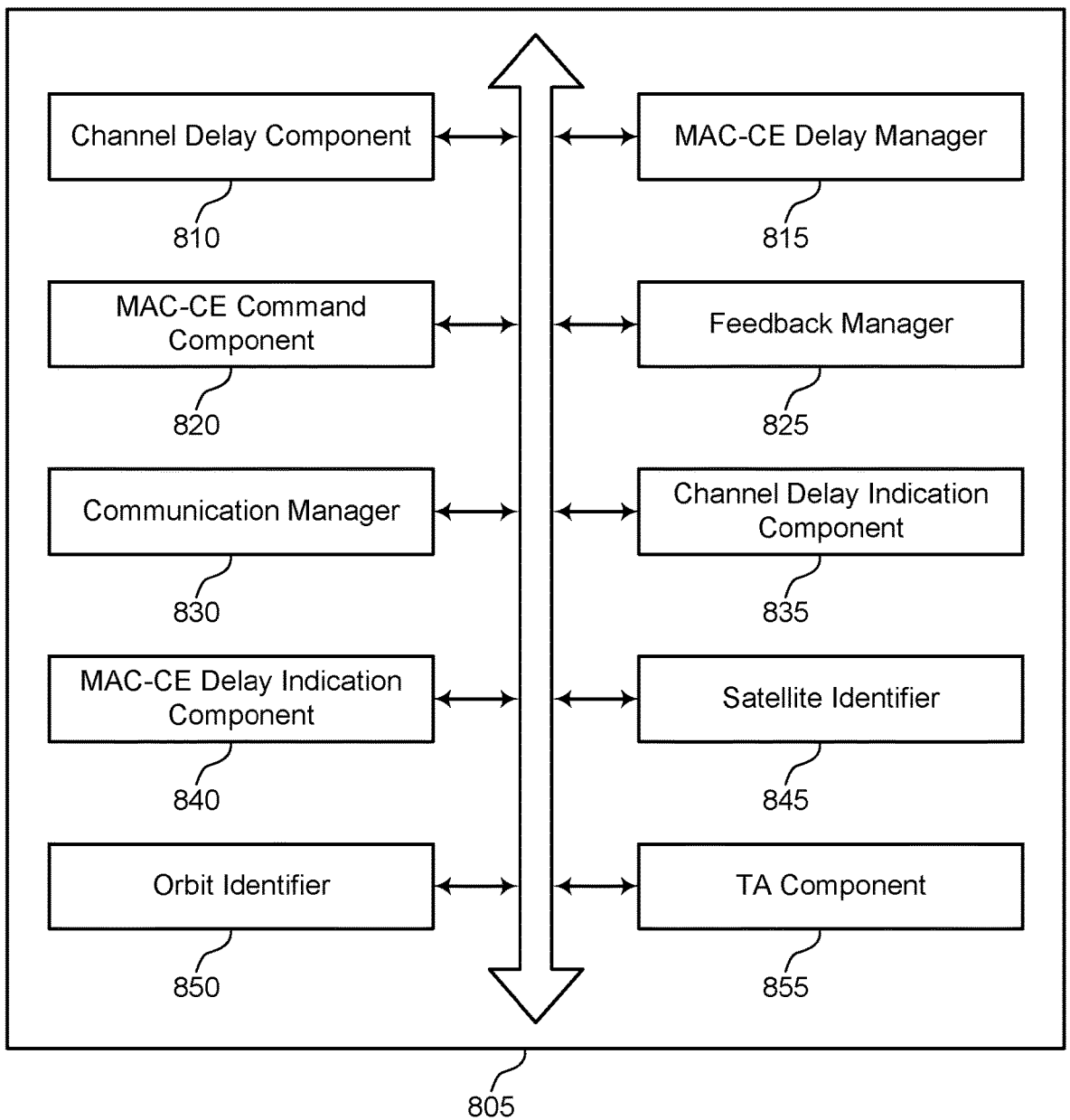
FIG. 8 shows a block diagram of a communications manager that supports medium access control-control element delay for non-terrestrial networks in accordance with aspects of the present disclosure.

FIG. 8 shows a block diagram of a communications manager 805 that supports MAC-CE delay for an NTN in accordance with aspects of the present disclosure. The communications manager 805 may be an example of aspects of a communications manager 615, a communications manager 715, or a communications manager 910 described herein. The communications manager 805 may include a channel delay component 810, a MAC-CE delay manager 815, a MAC-CE command component 820, a feedback manager 825, a communication manager 830, a channel delay indication component 835, a MAC-CE delay indication component 840, a satellite identifier 845, an orbit identifier 850, and a TA component 855. Each of these components may communicate, directly or indirectly, with one another (for example, via one or more buses).

The channel delay component 810 may establish a communication link over a channel having a channel delay in the NTN. The MAC-CE delay manager 815 may determine, based on the channel delay, a delay associated with a MAC-CE for communication in the NTN. In some examples, determining the delay associated with the MAC-CE includes determining the delay before establishing the communication link. In some examples, determining the delay includes determining the delay based on a configuration of a set of delays stored by the user terminal. In some examples, determining the delay associated with the MAC-CE includes determining the delay independent of a type of a satellite in the NTN. In some examples, determining the delay associated with the MAC-CE includes determining that the delay is greater than one or more of the channel delays, a slot duration, or an internal inter-layer delay. In some examples, determining the delay associated with the MAC-CE includes determining that the delay is greater than 3 milliseconds and based on an internal inter-layer delay including a communication delay between a physical layer and a medium access control layer.

In some examples, the MAC-CE delay manager 815 may determine a second delay associated with a second MAC-CE for communication in the NTN, in which the second delay is different than the first delay. In some examples, the delay associated with the MAC-CE includes a time offset associated with transmitting the feedback, in which communicating after the end of the delay includes communicating after an end of the time offset. In some examples, the delay associated with the MAC-CE includes an indication of a slot number associated with the communication parameter of the MAC-CE command, in which communicating after the end of the delay includes communicating in or after a slot corresponding to the slot number.

The MAC-CE command component 820 may receive a MAC-CE command indicating a communication parameter. The feedback manager 825 may transmit feedback based on the MAC-CE command.

The communication manager 830 may communicate with the NTN over the channel according to the communication parameter after an end of the delay. In some examples, the communication manager 830 may communicate with the NTN over the channel according to the communication parameter after an end of the second delay. In some examples, communicating with the NTN includes communicating directly between the user terminal and a satellite in the NTN.

The channel delay indication component 835 may determine an indication of the channel delay that is based on one or more of a location of a satellite in the NTN, a location of a beam of the satellite, or a location of the user terminal, in which determining the delay associated with the MAC-CE is based on determining the indication of the channel delay.

The MAC-CE delay indication component 840 may receive an indication of the delay associated with the MAC-CE in a delay configuration, in which determining the delay is based on receiving the indication of the delay. In some examples, receiving the indication of the delay in the delay configuration includes receiving the indication of the delay in one or more of a broadcast configuration messages, a group configuration message, or a dedicated configuration message. In some examples, receiving the indication of the delay in the delay configuration includes receiving the indication of the delay on one or more of a per satellite of the NTN basis, a per beam of the satellite basis, or a per cell of the NTN basis.

The satellite identifier 845 may determine a type of a satellite of the NTN, in which determining the delay associated with the MAC-CE is based on determining the type of the satellite of the NTN.

The orbit identifier 850 may determine an orbit of a satellite of the NTN, in which determining the delay associated with the MAC-CE is based on determining the orbit of the satellite. In some examples, determining the orbit of the satellite includes determining a highest orbit altitude of the satellite or an average orbit altitude of the satellite.

The TA component 855 may determine a timing advance based on the channel delay, in which communicating with the NTN is based on determining the timing advance.

Figure 9:
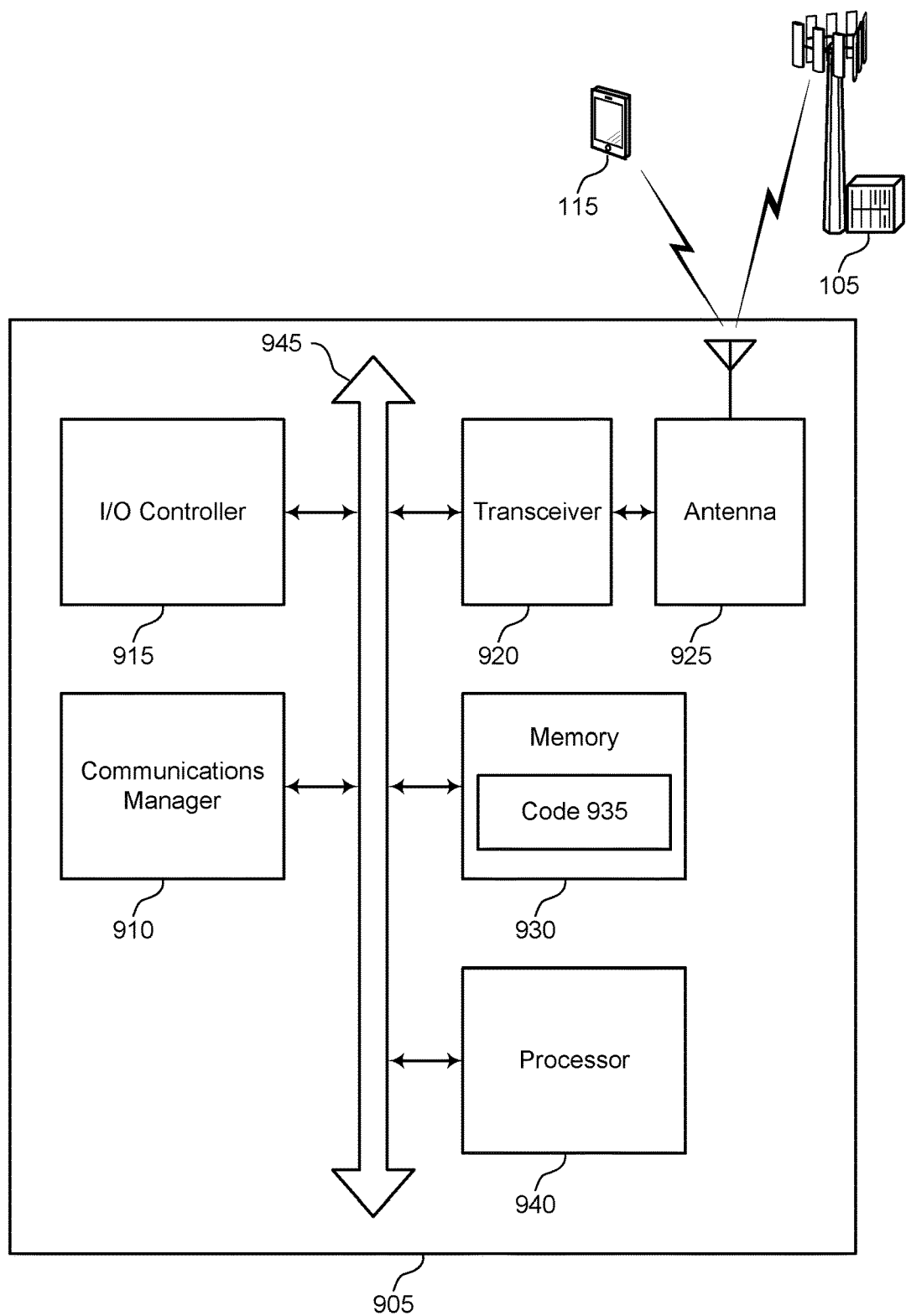
FIG. 9 shows a diagram of a system including a device that supports medium access control-control element delay for non-terrestrial networks in accordance with aspects of the present disclosure.

FIG. 9 shows a diagram of a system including a device 905 that supports MAC-CE delay for an NTN in accordance with aspects of the present disclosure. The device 905 may be an example of or include the components of device 605, device 705, or a user terminal 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (for example, bus 945).

The communications manager 910 may establish a communication link over a channel having a channel delay in the NTN, determine, based on the channel delay, a delay associated with a MAC-CE for communication in the NTN, receive a MAC-CE command indicating a communication parameter, transmit feedback based on the MAC-CE command, and communicate with the NTN over the channel according to the communication parameter after an end of the delay.

The I/O controller 915 may manage input and output signals for the device 905. The I/O controller 915 may also manage peripherals not integrated into the device 905. In some examples, the I/O controller 915 may represent a physical connection or port to an external peripheral. In some examples, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some examples, the I/O controller 915 may be implemented as part of a processor. In some examples, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some examples, the wireless device may include a single antenna 925. However, in some examples the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some examples, the memory 930 may contain, among other things, a basic I/O system (BIOS) which may control basic hardware or software operation such as the interaction with peripheral components or devices.

The processor 940 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In other cases, a memory controller may be integrated into the processor 940. The processor 940 may be configured to execute computer-readable instructions stored in a memory (for example, the memory 930) to cause the device 905 to perform various functions (for example, functions or tasks supporting MAC-CE delay for an NTN).

The code 935 may include instructions to implement aspects of the present disclosure, including instructions to support wireless communications. The code 935 may be stored in a non-transitory computer-readable medium such as system memory or other type of memory. In some examples, the code 935 may not be directly executable by the processor 940 but may cause a computer (for example, when compiled and executed) to perform functions described herein.

Figure 10:
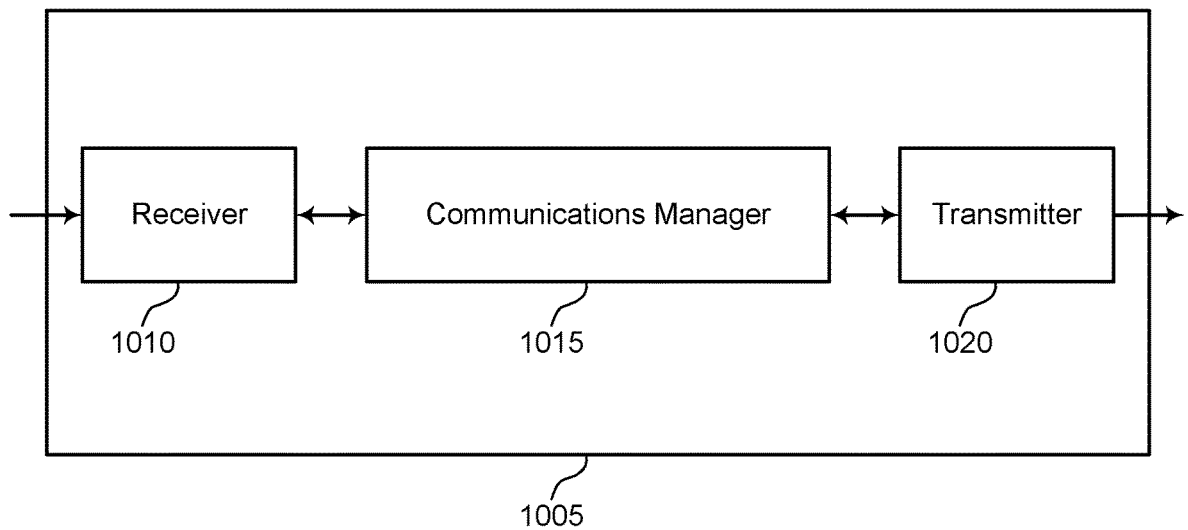
FIGS. 10 and 11 show block diagrams of devices that support medium access control-control element delay for non-terrestrial networks in accordance with aspects of the present disclosure.

FIG. 10 shows a block diagram of a device 1005 that supports MAC-CE delay for an NTN in accordance with aspects of the present disclosure. The device 1005 may be an example of aspects of a base station 105 as described herein. The device 1005 may include a receiver 1010, a communications manager 1015, and a transmitter 1020. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to MAC-CE delay for an NTN). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish a communication link over a channel having a channel delay in the NTN, transmit a MAC-CE command indicating a communication parameter, receive feedback associated with a user terminal based on transmitting the MAC-CE command, and communicate with the NTN over the channel according to the communication parameter after an end of a delay associated with a MAC-CE. The communications manager 1015 may be an example of aspects of the communications manager 1310 described herein.

The communications manager 1015, or its sub-components, may be implemented in hardware, code (for example, software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at different locations, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
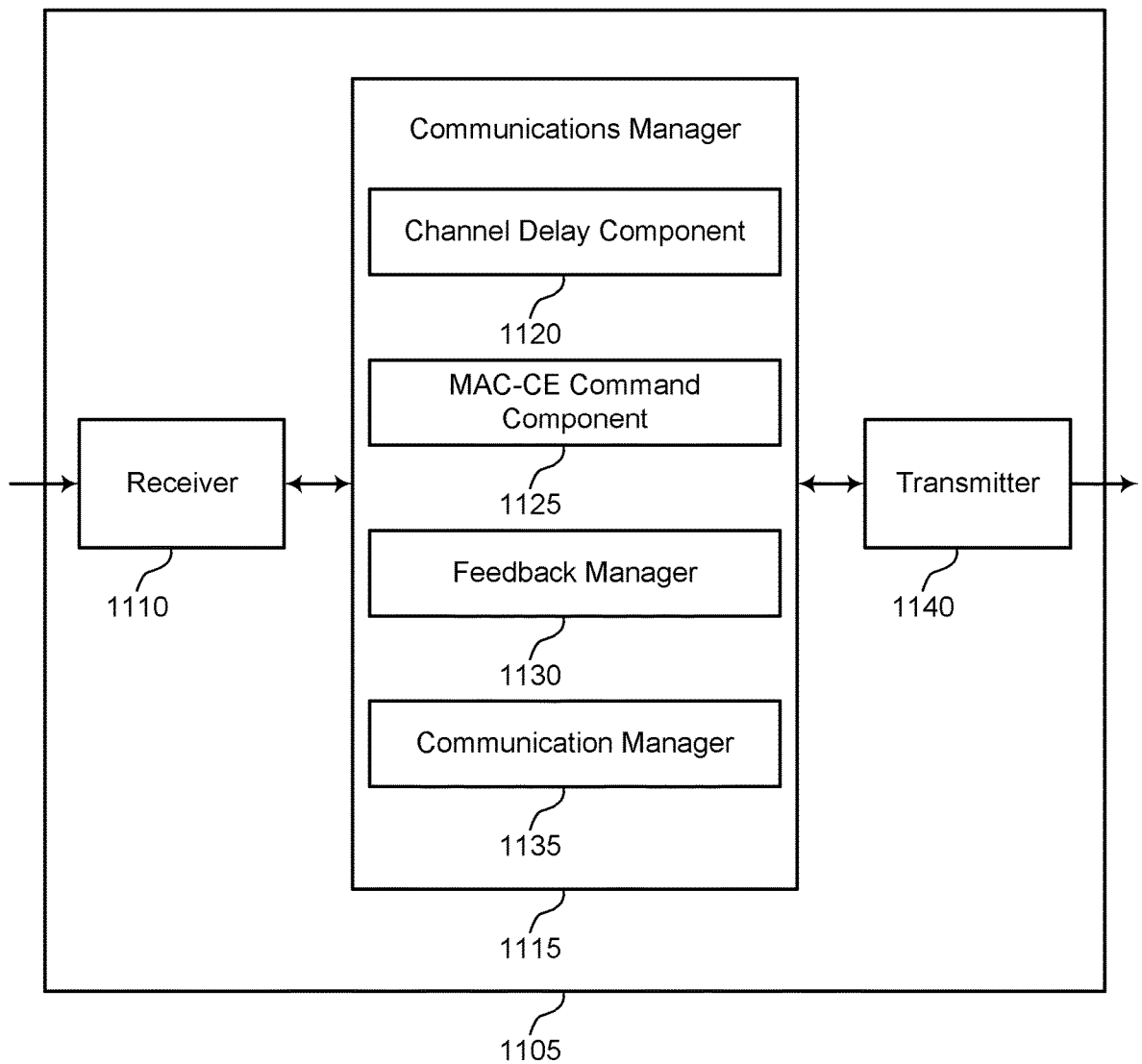

FIG. 11 shows a block diagram of a device 1105 that supports MAC-CE delay for an NTN in accordance with aspects of the present disclosure. The device 1105 may be an example of aspects of a device 1005, or a base station 105 as described herein. The device 1105 may include a receiver 1110, a communications manager 1115, and a transmitter 1140. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to MAC-CE delay for an NTN). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a channel delay component 1120, a MAC-CE command component 1125, a feedback manager 1130, and a communication manager 1135. The communications manager 1115 may be an example of aspects of the communications manager 1310 described herein.

The channel delay component 1120 may establish a communication link over a channel having a channel delay in the NTN. The MAC-CE command component 1125 may transmit a MAC-CE command indicating a communication parameter. The feedback manager 1130 may receive feedback associated with a user terminal based on transmitting the MAC-CE command. The communication manager 1135 may communicate with the NTN over the channel according to the communication parameter after an end of a delay associated with a MAC-CE.

The transmitter 1140 may transmit signals generated by other components of the device 1105. In some examples, the transmitter 1140 may be collocated with a receiver 1110 in a transceiver component. For example, the transmitter 1140 may be an example of aspects of the transceiver 1320 described with reference to FIG. 13. The transmitter 1140 may utilize a single antenna or a set of antennas.

Figure 12:
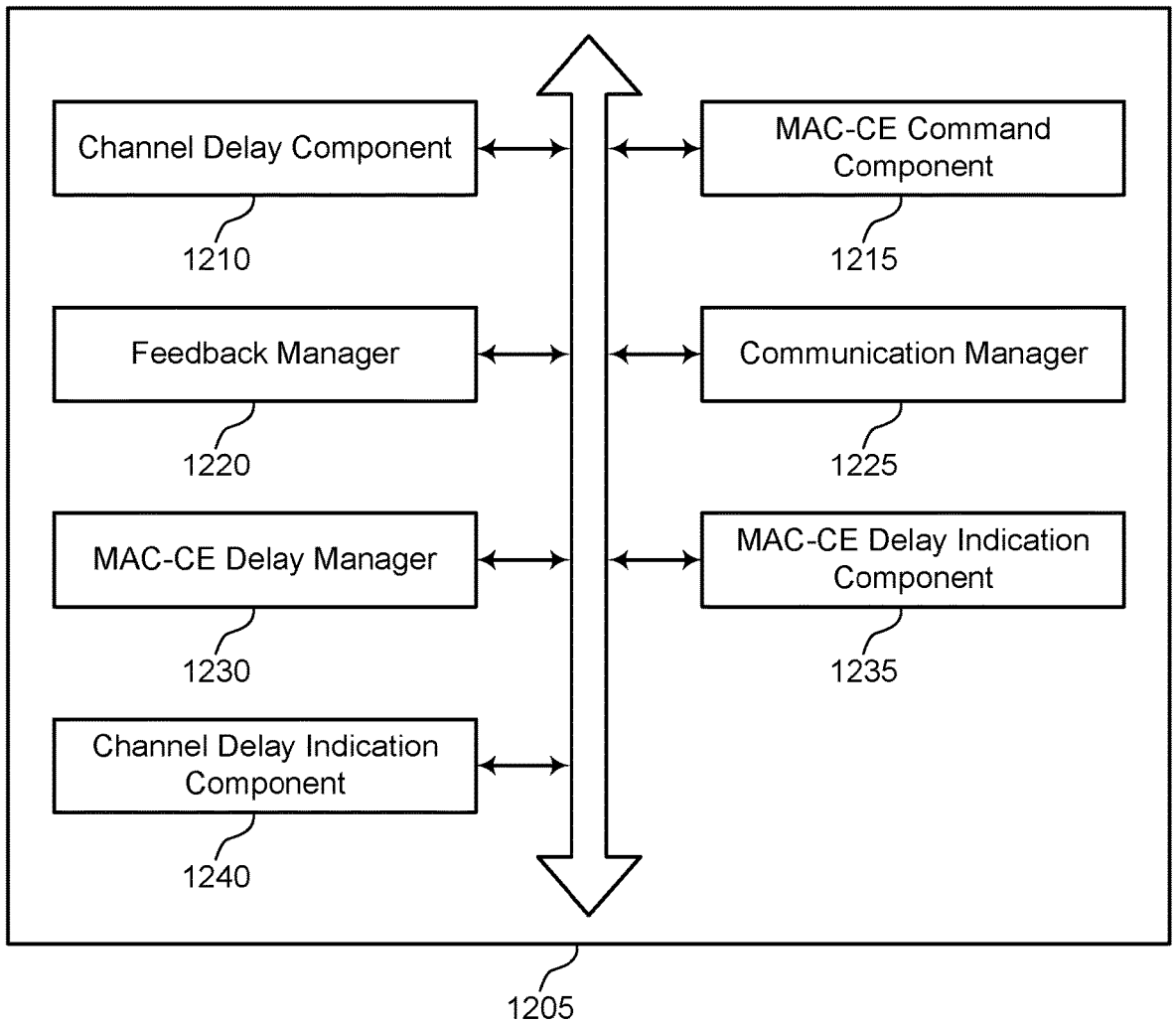
FIG. 12 shows a block diagram of a communications manager that supports medium access control-control element delay for non-terrestrial networks in accordance with aspects of the present disclosure.

FIG. 12 shows a block diagram of a communications manager 1205 that supports MAC-CE delay for an NTN in accordance with aspects of the present disclosure. The communications manager 1205 may be an example of aspects of a communications manager 1015, a communications manager 1115, or a communications manager 1310 described herein. The communications manager 1205 may include a channel delay component 1210, a MAC-CE command component 1215, a feedback manager 1220, a communication manager 1225, a MAC-CE delay manager 1230, a MAC-CE delay indication component 1235, and a channel delay indication component 1240. Each of these components may communicate, directly or indirectly, with one another (for example, via one or more buses).

The channel delay component 1210 may establish a communication link over a channel having a channel delay in the NTN. The MAC-CE command component 1215 may transmit a MAC-CE command indicating a communication parameter. The feedback manager 1220 may receive feedback associated with a user terminal based on transmitting the MAC-CE command. The communication manager 1225 may communicate with the NTN over the channel according to the communication parameter after an end of a delay associated with a MAC-CE. In some examples, communicating with the NTN includes communicating directly between the satellite and the user terminal in the NTN. In some examples, the delay associated with the MAC-CE includes a time offset associated with receiving the feedback, in which communicating after the end of the delay includes communicating after an end of the time offset. In some examples, the delay associated with the MAC-CE includes an indication of a slot number associated with the communication parameter of the MAC-CE command, in which communicating after the end of the delay includes communicating in or after a slot corresponding to the slot number.

The MAC-CE delay manager 1230 may determine the delay associated with the MAC-CE. In some examples, the MAC-CE delay manager 1230 may determine, based on the channel delay, the delay associated with the MAC-CE for communication specific to the user terminal in the NTN.

The MAC-CE delay indication component 1235 may transmit an indication of the delay associated with the MAC-CE, in which communicating with the NTN over the channel according to the communication parameter after the end of the delay is based on transmitting the indication of the delay. In some examples, transmitting the indication of the delay includes transmitting the indication of the delay in one or more of a broadcast configuration messages, a group configuration message, or a dedicated configuration message.

The channel delay indication component 1240 may transmit an indication of the channel delay that is based on one or more of a location of a satellite in the NTN, a location of a beam of the satellite, or a location of the user terminal, in which communicating with the NTN over the channel according to the communication parameter after the end of the delay is based on transmitting the indication of the channel delay.

Figure 13:
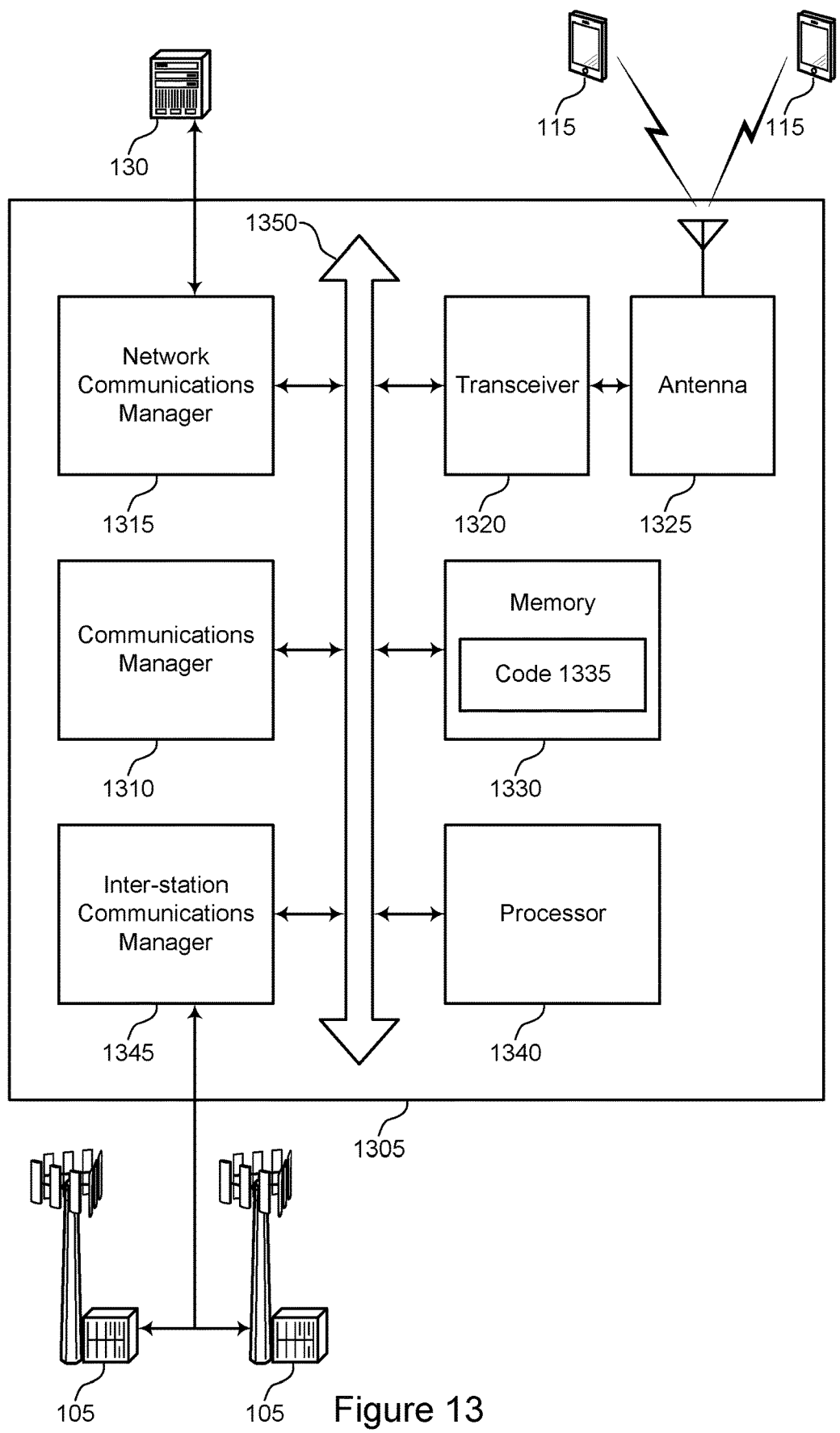
FIG. 13 shows a diagram of a system including a device that supports medium access control-control element delay for non-terrestrial networks in accordance with aspects of the present disclosure.

FIG. 13 shows a diagram of a system including a device 1305 that supports MAC-CE delay for an NTN in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (for example, bus 1350).

The communications manager 1310 may establish a communication link over a channel having a channel delay in the NTN, transmit a MAC-CE command indicating a communication parameter, receive feedback associated with a user terminal based on transmitting the MAC-CE command, and communicate with the NTN over the channel according to the communication parameter after an end of a delay associated with a MAC-CE.

The network communications manager 1315 may manage communications with the core network (for example, via one or more wired backhaul links). For example, the network communications manager 1315 may manage the transfer of data communications for client devices, such as one or more user terminals 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some examples the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (for example, the processor 1340) cause the device to perform various functions described herein. In some examples, the memory 1330 may contain, among other things, a BIOS which may control basic hardware or software operation such as the interaction with peripheral components or devices.

The processor 1340 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1340 may be configured to operate a memory array using a memory controller. In some examples, a memory controller may be integrated into processor 1340. The processor 1340 may be configured to execute computer-readable instructions stored in a memory (for example, the memory 1330) to cause the device 1305 to perform various functions (for example, functions or tasks supporting MAC-CE delay for an NTN).

The inter-station communications manager 1345 may manage communications with another base station 105, and may include a controller or scheduler for controlling communications with user terminals 115 in cooperation with other base stations 105. For example, the inter-station communications manager 1345 may coordinate scheduling for transmissions to user terminals 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (for example, when compiled and executed) to perform functions described herein.

Figure 14:
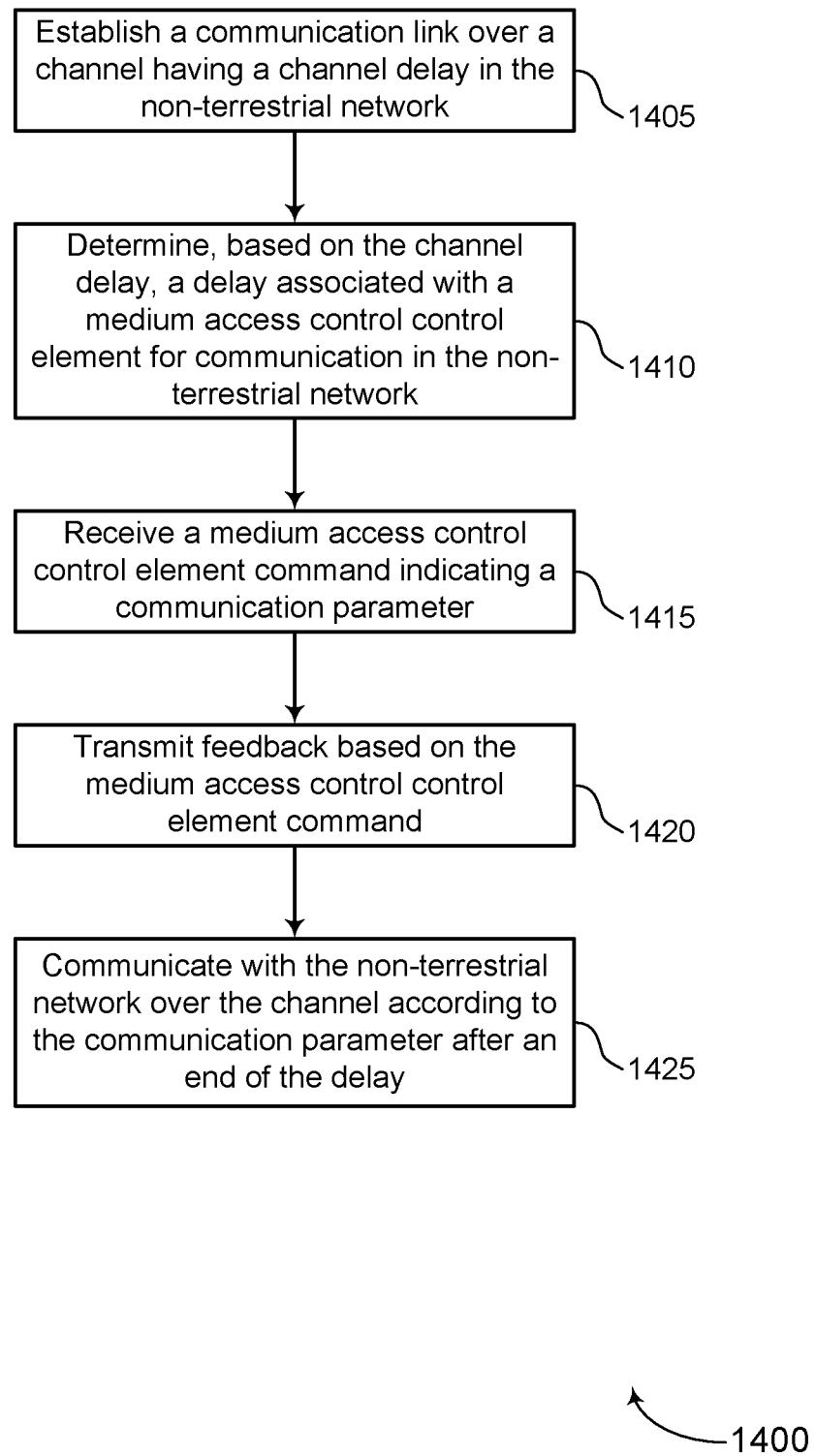
FIGS. 14 through 19 show flowcharts illustrating methods that support medium access control-control element delay for non-terrestrial networks in accordance with aspects of the present disclosure.

FIG. 14 shows a flowchart illustrating a method 1400 that supports MAC-CE delay for an NTN in accordance with aspects of the present disclosure. The operations of method 1400 may be implemented by a user terminal 115 or its components as described herein. For example, the operations of method 1400 may be performed by a communications manager as described with reference to FIGS. 6-9. In some examples, a UE may execute a set of instructions to control the functional elements of the UE to perform the functions described below. Additionally or alternatively, a UE may perform aspects of the functions described below using special-purpose hardware.

At 1405, the UE may establish a communication link over a channel having a channel delay in the NTN. The operations of 1405 may be performed according to the methods described herein. In some examples, aspects of the operations of 1405 may be performed by a channel delay component as described with reference to FIGS. 6-9.

At 1410, the UE may determine, based on the channel delay, a delay associated with a MAC-CE for communication in the NTN. The operations of 1410 may be performed according to the methods described herein. In some examples, aspects of the operations of 1410 may be performed by a MAC-CE delay manager as described with reference to FIGS. 6-9.

At 1415, the UE may receive a MAC-CE command indicating a communication parameter. The operations of 1415 may be performed according to the methods described herein. In some examples, aspects of the operations of 1415 may be performed by a MAC-CE command component as described with reference to FIGS. 6-9.

At 1420, the UE may transmit feedback based on the MAC-CE command. The operations of 1420 may be performed according to the methods described herein. In some examples, aspects of the operations of 1420 may be performed by a feedback manager as described with reference to FIGS. 6-9.

At 1425, the UE may communicate with the NTN over the channel according to the communication parameter after an end of the delay. The operations of 1425 may be performed according to the methods described herein. In some examples, aspects of the operations of 1425 may be performed by a communication manager as described with reference to FIGS. 6-9.

Figure 15:
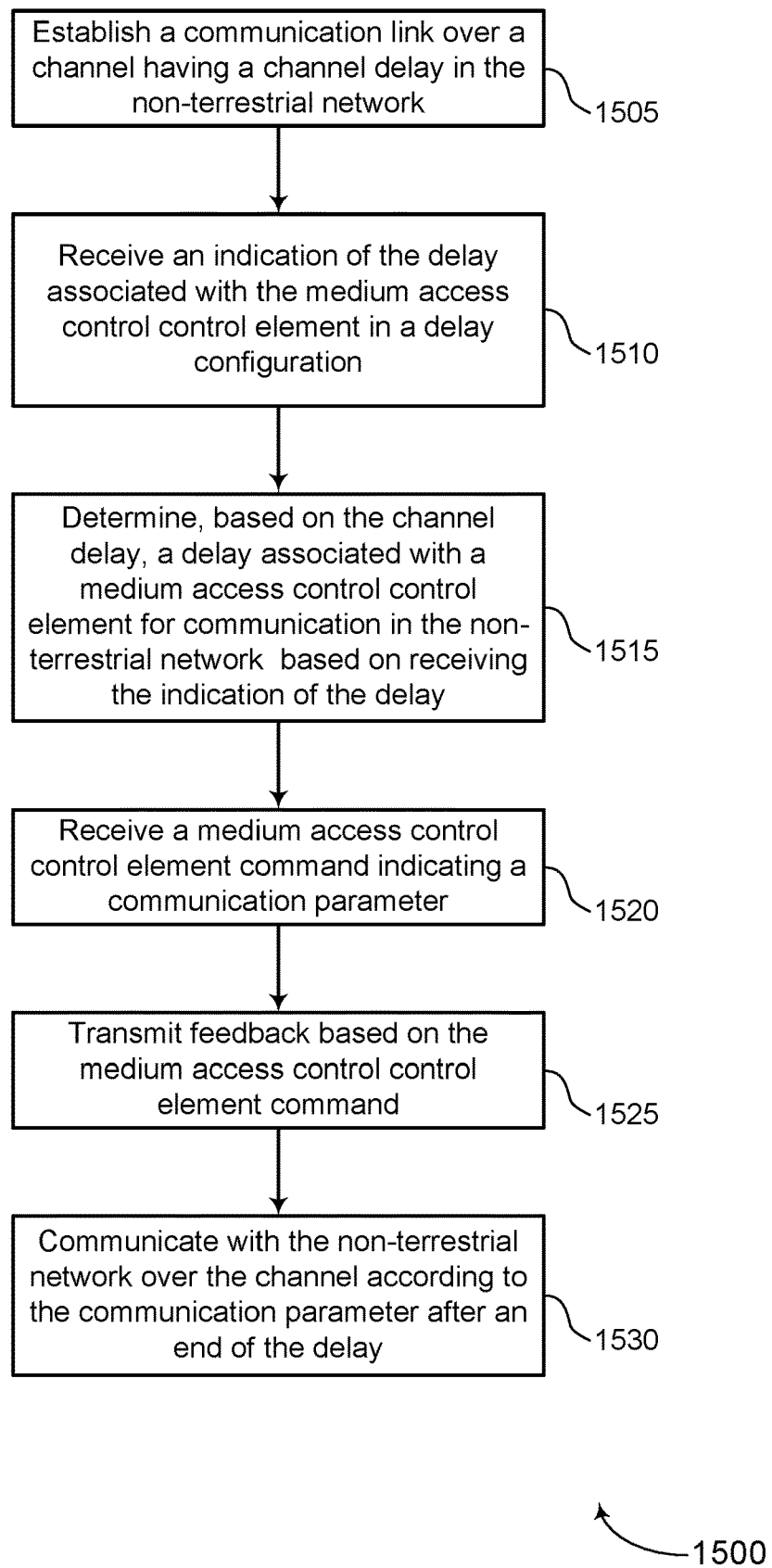

FIG. 15 shows a flowchart illustrating a method 1500 that supports MAC-CE delay for an NTN in accordance with aspects of the present disclosure. The operations of method 1500 may be implemented by a user terminal 115 or its components as described herein. For example, the operations of method 1500 may be performed by a communications manager as described with reference to FIGS. 6-9. In some examples, a UE may execute a set of instructions to control the functional elements of the UE to perform the functions described below. Additionally or alternatively, a UE may perform aspects of the functions described below using special-purpose hardware.

At 1505, the UE may establish a communication link over a channel having a channel delay in the NTN. The operations of 1505 may be performed according to the methods described herein. In some examples, aspects of the operations of 1505 may be performed by a channel delay component as described with reference to FIGS. 6-9.

At 1510, the UE may receive an indication of the delay associated with the MAC-CE in a delay configuration, in which determining the delay at 1515 may be based on receiving the indication of the delay. The operations of 1510 may be performed according to the methods described herein. In some examples, aspects of the operations of 1510 may be performed by a MAC-CE delay indication component as described with reference to FIGS. 6-9.

At 1515, the UE may determine, based on the channel delay, a delay associated with a MAC-CE for communication in the NTN. The operations of 1515 may be performed according to the methods described herein. In some examples, aspects of the operations of 1515 may be performed by a MAC-CE delay manager as described with reference to FIGS. 6-9.

At 1520, the UE may receive a MAC-CE command indicating a communication parameter. The operations of 1520 may be performed according to the methods described herein. In some examples, aspects of the operations of 1520 may be performed by a MAC-CE command component as described with reference to FIGS. 6-9.

At 1525, the UE may transmit feedback based on the MAC-CE command. The operations of 1525 may be performed according to the methods described herein. In some examples, aspects of the operations of 1525 may be performed by a feedback manager as described with reference to FIGS. 6-9.

At 1530, the UE may communicate with the NTN over the channel according to the communication parameter after an end of the delay. The operations of 1530 may be performed according to the methods described herein. In some examples, aspects of the operations of 1530 may be performed by a communication manager as described with reference to FIGS. 6-9.

Figure 16:
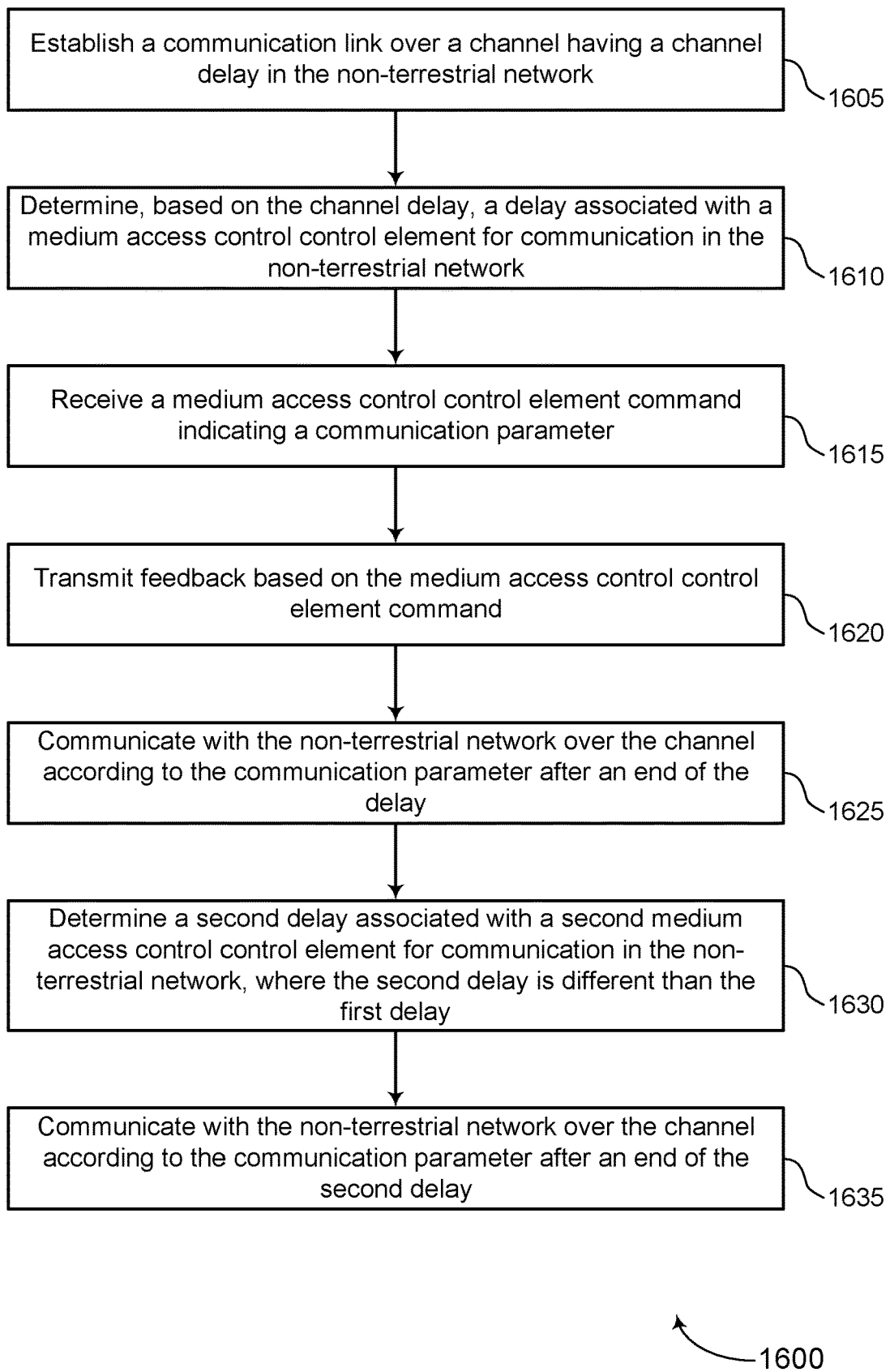

FIG. 16 shows a flowchart illustrating a method 1600 that supports MAC-CE delay for an NTN in accordance with aspects of the present disclosure. The operations of method 1600 may be implemented by a user terminal 115 or its components as described herein. For example, the operations of method 1600 may be performed by a communications manager as described with reference to FIGS. 6-9. In some examples, a UE may execute a set of instructions to control the functional elements of the UE to perform the functions described below. Additionally or alternatively, a UE may perform aspects of the functions described below using special-purpose hardware.

At 1605, the UE may establish a communication link over a channel having a channel delay in the NTN. The operations of 1605 may be performed according to the methods described herein. In some examples, aspects of the operations of 1605 may be performed by a channel delay component as described with reference to FIGS. 6-9.

At 1610, the UE may determine, based on the channel delay, a delay associated with a MAC-CE for communication in the NTN. The operations of 1610 may be performed according to the methods described herein. In some examples, aspects of the operations of 1610 may be performed by a MAC-CE delay manager as described with reference to FIGS. 6-9.

At 1615, the UE may receive a MAC-CE command indicating a communication parameter. The operations of 1615 may be performed according to the methods described herein. In some examples, aspects of the operations of 1615 may be performed by a MAC-CE command component as described with reference to FIGS. 6-9.

At 1620, the UE may transmit feedback based on the MAC-CE command. The operations of 1620 may be performed according to the methods described herein. In some examples, aspects of the operations of 1620 may be performed by a feedback manager as described with reference to FIGS. 6-9.

At 1625, the UE may communicate with the NTN over the channel according to the communication parameter after an end of the delay. The operations of 1625 may be performed according to the methods described herein. In some examples, aspects of the operations of 1625 may be performed by a communication manager as described with reference to FIGS. 6-9.

At 1630, the UE may determine a second delay associated with a second MAC-CE for communication in the NTN, in which the second delay is different than the first delay at 1610. The operations of 1630 may be performed according to the methods described herein. In some examples, aspects of the operations of 1630 may be performed by a MAC-CE delay manager as described with reference to FIGS. 6-9.

At 1635, the UE may communicate with the NTN over the channel according to the communication parameter after an end of the second delay. The operations of 1635 may be performed according to the methods described herein. In some examples, aspects of the operations of 1635 may be performed by a communication manager as described with reference to FIGS. 6-9.

Figure 17:
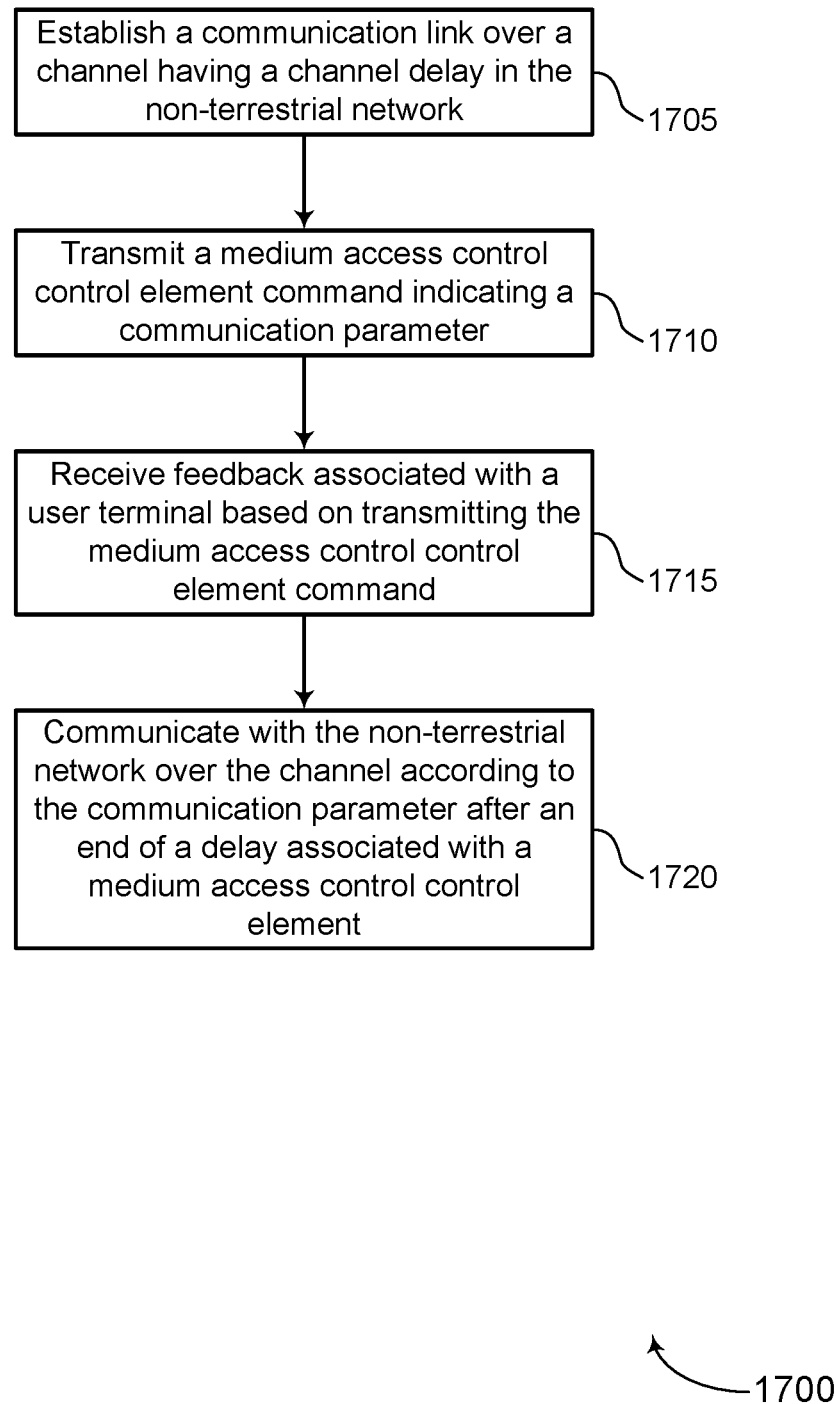

FIG. 17 shows a flowchart illustrating a method 1700 that supports MAC-CE delay for an NTN in accordance with aspects of the present disclosure. The operations of method 1700 may be implemented by a base station 105 or its components as described herein. For example, the operations of method 1700 may be performed by a communications manager as described with reference to FIGS. 10-13. In some examples, a base station may execute a set of instructions to control the functional elements of the base station to perform the functions described below. Additionally or alternatively, a base station may perform aspects of the functions described below using special-purpose hardware.

At 1705, the base station may establish a communication link over a channel having a channel delay in the NTN. The operations of 1705 may be performed according to the methods described herein. In some examples, aspects of the operations of 1705 may be performed by a channel delay component as described with reference to FIGS. 10-13.

At 1710, the base station may transmit a MAC-CE command indicating a communication parameter. The operations of 1710 may be performed according to the methods described herein. In some examples, aspects of the operations of 1710 may be performed by a MAC-CE command component as described with reference to FIGS. 10-13.

At 1715, the base station may receive feedback associated with a user terminal based on transmitting the MAC-CE command. The operations of 1715 may be performed according to the methods described herein. In some examples, aspects of the operations of 1715 may be performed by a feedback manager as described with reference to FIGS. 10-13.

At 1720, the base station may communicate with the NTN over the channel according to the communication parameter after an end of a delay associated with a MAC-CE. The operations of 1720 may be performed according to the methods described herein. In some examples, aspects of the operations of 1720 may be performed by a communication manager as described with reference to FIGS. 10-13.

Figure 18:
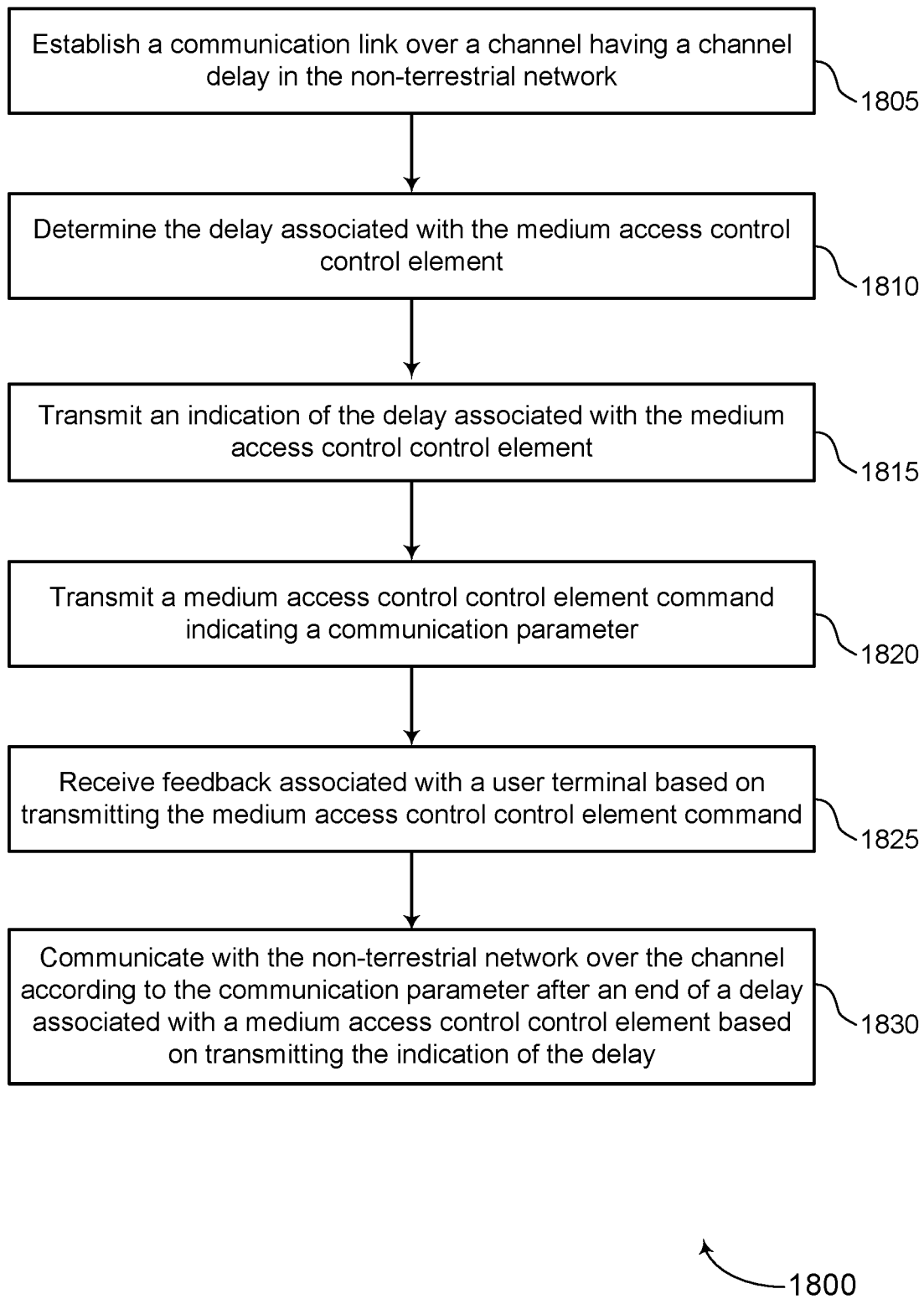

FIG. 18 shows a flowchart illustrating a method 1800 that supports MAC-CE delay for an NTN in accordance with aspects of the present disclosure. The operations of method 1800 may be implemented by a base station 105 or its components as described herein. For example, the operations of method 1800 may be performed by a communications manager as described with reference to FIGS. 10-13. In some examples, a base station may execute a set of instructions to control the functional elements of the base station to perform the functions described below. Additionally or alternatively, a base station may perform aspects of the functions described below using special-purpose hardware.

At 1805, the base station may establish a communication link over a channel having a channel delay in the NTN. The operations of 1805 may be performed according to the methods described herein. In some examples, aspects of the operations of 1805 may be performed by a channel delay component as described with reference to FIGS. 10-13.

At 1810, the base station may determine the delay associated with the MAC-CE. The operations of 1810 may be performed according to the methods described herein. In some examples, aspects of the operations of 1810 may be performed by a MAC-CE delay manager as described with reference to FIGS. 10-13.

At 1815, the base station may transmit an indication of the delay associated with the MAC-CE, in which communicating at 1830 with the NTN over the channel according to the communication parameter after the end of the delay is based on transmitting the indication of the delay. The operations of 1815 may be performed according to the methods described herein. In some examples, aspects of the operations of 1815 may be performed by a MAC-CE delay indication component as described with reference to FIGS. 10-13.

At 1820, the base station may transmit a MAC-CE command indicating a communication parameter. The operations of 1820 may be performed according to the methods described herein. In some examples, aspects of the operations of 1820 may be performed by a MAC-CE command component as described with reference to FIGS. 10-13.

At 1825, the base station may receive feedback associated with a user terminal based on transmitting the MAC-CE command. The operations of 1825 may be performed according to the methods described herein. In some examples, aspects of the operations of 1825 may be performed by a feedback manager as described with reference to FIGS. 10-13.

At 1830, the base station may communicate with the NTN over the channel according to the communication parameter after an end of a delay associated with a MAC-CE. The operations of 1830 may be performed according to the methods described herein. In some examples, aspects of the operations of 1830 may be performed by a communication manager as described with reference to FIGS. 10-13.

Figure 19:
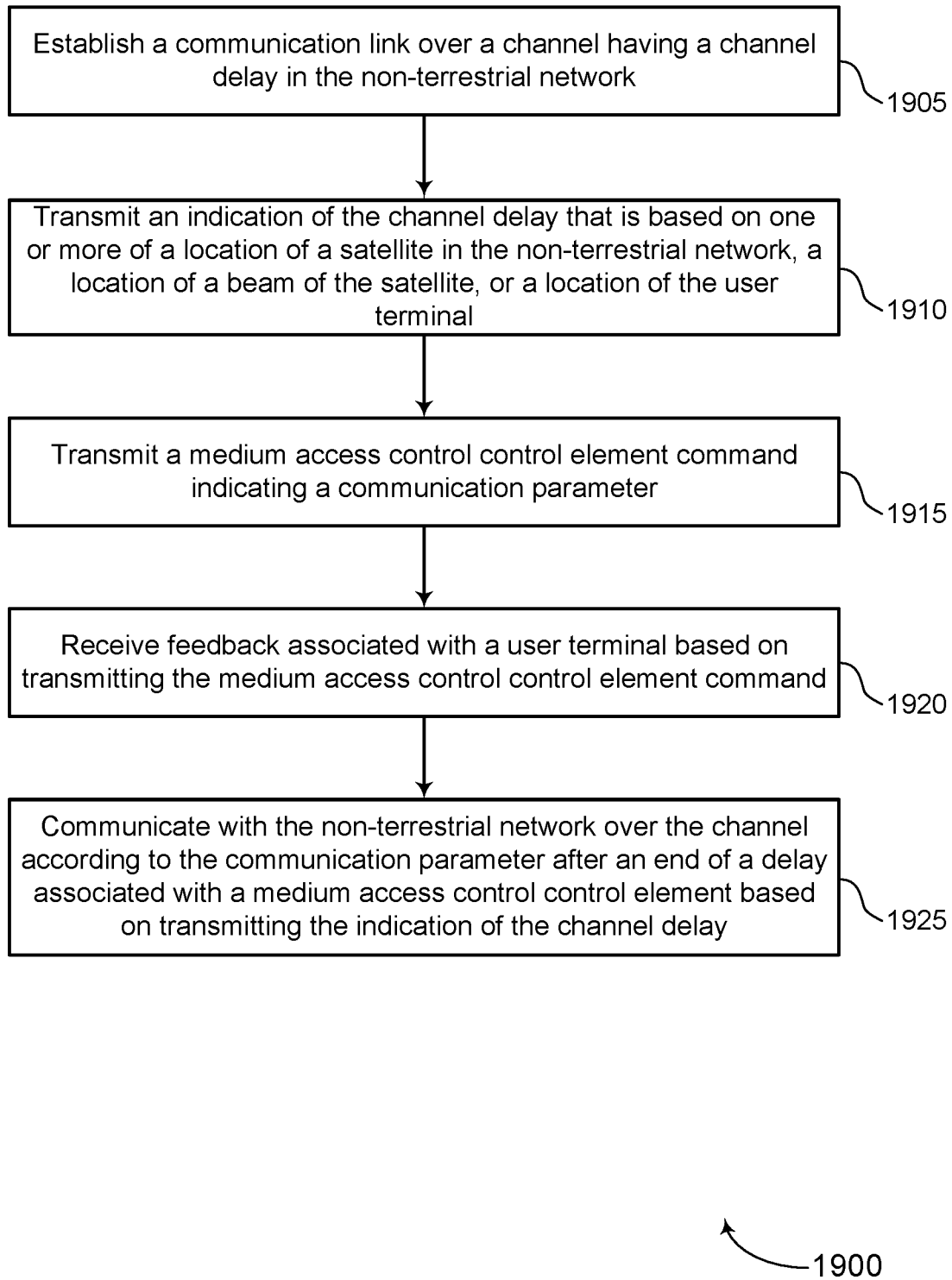

FIG. 19 shows a flowchart illustrating a method 1900 that supports MAC-CE delay for an NTN in accordance with aspects of the present disclosure. The operations of method 1900 may be implemented by a base station 105 or its components as described herein. For example, the operations of method 1900 may be performed by a communications manager as described with reference to FIGS. 10-13. In some examples, a base station may execute a set of instructions to control the functional elements of the base station to perform the functions described below. Additionally or alternatively, a base station may perform aspects of the functions described below using special-purpose hardware.

At 1905, the base station may establish a communication link over a channel having a channel delay in the NTN. The operations of 1905 may be performed according to the methods described herein. In some examples, aspects of the operations of 1905 may be performed by a channel delay component as described with reference to FIGS. 10-13.

At 1910, the base station may transmit an indication of the channel delay that is based on one or more of a location of a satellite in the NTN, a location of a beam of the satellite, or a location of the user terminal, in which communicating with the NTN over the channel according to the communication parameter after the end of the delay is based on transmitting the indication of the channel delay. The operations of 1910 may be performed according to the methods described herein. In some examples, aspects of the operations of 1910 may be performed by a channel delay indication component as described with reference to FIGS. 10-13.

At 1915, the base station may transmit a MAC-CE command indicating a communication parameter. The operations of 1915 may be performed according to the methods described herein. In some examples, aspects of the operations of 1915 may be performed by a MAC-CE command component as described with reference to FIGS. 10-13.

At 1920, the base station may receive feedback associated with a user terminal based on transmitting the MAC-CE command. The operations of 1920 may be performed according to the methods described herein. In some examples, aspects of the operations of 1920 may be performed by a feedback manager as described with reference to FIGS. 10-13.

At 1925, the base station may communicate with the NTN over the channel according to the communication parameter after an end of a delay associated with a MAC-CE. The operations of 1925 may be performed according to the methods described herein. In some examples, aspects of the operations of 1925 may be performed by a communication manager as described with reference to FIGS. 10-13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person having ordinary skill in the art to make or use the disclosure. Various modifications to the disclosure will be readily apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user terminal in a non-terrestrial network, comprising:
    establishing a communication link over a channel having a channel delay in the non-terrestrial network;
    determining, based at least in part on the channel delay, a delay associated with a medium access control-control element for communication in the non-terrestrial network;
    receiving a medium access control-control element command indicating a communication parameter, wherein the delay is a duration of time before the communication parameter is implemented within the non-terrestrial network by the user terminal and by one or more entities in communication with the user terminal;
    transmitting feedback based at least in part on the medium access control-control element command;
    communicating with the non-terrestrial network over the channel according to the communication parameter after an end of the delay;
    determining a second delay associated with a second medium access control-control element for communication in the non-terrestrial network, wherein the second delay is different from the first delay; and
    communicating with the non-terrestrial network over the channel according to the communication parameter after an end of the second delay.

2. The method of claim 1, further comprising determining an indication of the channel delay that is based at least in part on one or more of a location of a satellite in the non-terrestrial network, a location of a beam of the satellite, or a location of the user terminal, wherein determining the delay associated with the medium access control-control element is based at least in part on determining the indication of the channel delay.

3. The method of claim 1, further comprising receiving an indication of the delay associated with the medium access control-control element in a delay configuration, wherein determining the delay is based at least in part on receiving the indication of the delay.

4. The method of claim 3, wherein receiving the indication of the delay in the delay configuration comprises receiving the indication of the delay in one or more of a broadcast configuration message, a group configuration message, or a dedicated configuration message.

5. The method of claim 3, wherein receiving the indication of the delay in the delay configuration comprises receiving the indication of the delay on one or more of a per satellite of the non-terrestrial network basis, a per beam of the satellite basis, or a per cell of the non-terrestrial network basis.

6. The method of claim 1, wherein determining the delay associated with the medium access control-control element comprises determining the delay before establishing the communication link.

7. The method of claim 6, wherein determining the delay comprises determining the delay based at least in part on a configuration of a plurality of delays stored by the user terminal.

8. The method of claim 1, wherein determining the delay associated with the medium access control-control element comprises determining the delay independent of a type of a satellite in the non-terrestrial network.

9. The method of claim 1, wherein the delay associated with the medium access control-control element comprises a time offset associated with transmitting the feedback, wherein communicating after the end of the delay comprises communicating after an end of the time offset.

10. The method of claim 1, wherein the delay associated with the medium access control-control element comprises an indication of a slot number associated with the communication parameter of the medium access control-control element command, wherein communicating after the end of the delay comprises communicating in or after a slot corresponding to the slot number.

11. The method of claim 1, further comprising determining a type of a satellite of the non-terrestrial network, wherein determining the delay associated with the medium access control-control element is based at least in part on determining the type of the satellite of the non-terrestrial network.

12. The method of claim 1, further comprising determining an orbit of a satellite of the non-terrestrial network, wherein determining the delay associated with the medium access control-control element is based at least in part on determining the orbit of the satellite.

13. The method of claim 12, wherein determining the orbit of the satellite comprises determining a highest orbit altitude of the satellite or an average orbit altitude of the satellite.

14. The method of claim 1, wherein determining the delay associated with the medium access control-control element comprises determining that the delay is greater than one or more of the channel delay, a slot duration, or an internal inter-layer delay.

15. The method of claim 1, further comprising determining a timing advance based at least in part on the channel delay, wherein communicating with the non-terrestrial network is based at least in part on determining the timing advance.

16. The method of claim 1, wherein determining the delay associated with the medium access control-control element comprises determining that the delay is greater than 3 milliseconds and based at least in part on an internal inter-layer delay comprising a communication delay between a physical layer and a medium access control layer.

17. The method of claim 1, wherein communicating with the non-terrestrial network comprises communicating directly between the user terminal and a satellite in the non-terrestrial network.

18. A method for wireless communication at a satellite in a non-terrestrial network, comprising:
   establishing a communication link over a channel having a channel delay in the non-terrestrial network;
   transmitting a medium access control-control element command indicating a communication parameter;
   receiving feedback associated with a user terminal based at least in part on transmitting the medium access control-control element command;
   communicating with the non-terrestrial network over the channel according to the communication parameter after an end of a delay associated with a medium access control-control element, wherein the delay is a duration of time before the communication parameter is implemented within the non-terrestrial network by the user terminal and by one or more entities in communication with the user terminal;
   transmitting a second medium access control-control element command; and
   communicating with the non-terrestrial network over the channel according to the communication parameter after an end of a second delay associated with a second medium access-control control element, wherein the second delay is different from the first delay.

19. The method of claim 18, further comprising:
   determining the delay associated with the medium access control-control element; and
   transmitting an indication of the delay associated with the medium access control-control element, wherein communicating with the non-terrestrial network over the channel according to the communication parameter after the end of the delay is based at least in part on transmitting the indication of the delay.

20. The method of claim 19, wherein transmitting the indication of the delay comprises transmitting the indication of the delay in one or more of a broadcast configuration message, a group configuration message, or a dedicated configuration message.

21. The method of claim 18, further comprising determining, based at least in part on the channel delay, the delay associated with the medium access control-control element for communication specific to the user terminal in the non-terrestrial network.

22. The method of claim 18, further comprising transmitting an indication of the channel delay that is based at least in part on one or more of a location of a satellite in the non-terrestrial network, a location of a beam of the satellite, or a location of the user terminal, wherein communicating with the non-terrestrial network over the channel according to the communication parameter after the end of the delay is based at least in part on transmitting the indication of the channel delay.

23. The method of claim 18, wherein the delay associated with the medium access control-control element comprises a time offset associated with receiving the feedback, wherein communicating after the end of the delay comprises communicating after an end of the time offset.

24. The method of claim 18, wherein the delay associated with the medium access control-control element comprises an indication of a slot number associated with the communication parameter of the medium access control-control element command, wherein communicating after the end of the delay comprises communicating in or after a slot corresponding to the slot number.

25. The method of claim 18, wherein communicating with the non-terrestrial network comprises communicating directly between the satellite and the user terminal in the non-terrestrial network.

26. An apparatus for wireless communication at a user terminal in a non-terrestrial network, comprising: a processor, memory coupled with the processor; and instructions stored in the memory and executable by the processor to cause the apparatus to:
  establish a communication link over a channel having a channel delay in the non-terrestrial network;
  determine, based at least in part on the channel delay, a delay associated with a medium access control-control element for communication in the non-terrestrial network;
  receive a medium access control-control element command indicating a communication parameter, wherein the delay is a duration of time before the communication parameter is implemented within the non-terrestrial network by the user terminal and by one or more entities in communication with the user terminal;
  transmit feedback based at least in part on the medium access control-control element command;
  communicate with the non-terrestrial network over the channel according to the communication parameter after an end of the delay;
  determine a second delay associated with a second medium access control-control element for communication in the non-terrestrial network, wherein the second delay is different from the first delay; and
  communicate with the non-terrestrial network over the channel according to the communication parameter after an end of the second delay.

27. The apparatus of claim 26, wherein the instructions are further executable by the processor to cause the apparatus to determine an indication of the channel delay that is based at least in part on one or more of a location of a satellite in the non-terrestrial network, a location of a beam of the satellite, or a location of the user terminal, wherein determining the delay associated with the medium access control-control element is based at least in part on determining the indication of the channel delay.

28. An apparatus for wireless communication at a satellite in a non-terrestrial network, comprising: a processor, memory coupled with the processor; and instructions stored in the memory and executable by the processor to cause the apparatus to:
  establish a communication link over a channel having a channel delay in the non-terrestrial network;
  transmit a medium access control-control element command indicating a communication parameter;
  receive feedback associated with a user terminal based at least in part on transmitting the medium access control-control element command;
  communicate with the non-terrestrial network over the channel according to the communication parameter after an end of a delay associated with a medium access control-control element, wherein the delay is a duration of time before the communication parameter is implemented within the non-terrestrial network by the user terminal and by one or more entities in communication with the user terminal;
  transmit a second medium access control-control element command; and
  communicate with the non-terrestrial network over the channel according to the communication parameter after an end of a second delay associated with a second medium access-control control element, wherein the second delay is different from the first delay.

29. The apparatus of claim 28, wherein the instructions are further executable by the processor to cause the apparatus to:
  determine the delay associated with the medium access control-control element; and
  transmit an indication of the delay associated with the medium access control-control element, wherein communicating with the non-terrestrial network over the channel according to the communication parameter after the end of the delay is based at least in part on transmitting the indication of the delay.

* * * * *